United States Patent
Srinivasan et al.

(10) Patent No.: US 11,459,965 B2
(45) Date of Patent: Oct. 4, 2022

(54) EXHAUST GAS RECIRCULATION FLOW CONTROL FOR REDUCING EMISSIONS WITH VARIABLE DISPLACEMENT INTERNAL COMBUSTION ENGINES

(71) Applicants: Tula Technology, Inc., San Jose, CA (US); Cummins Inc., Columbus, IN (US)

(72) Inventors: Vijay Srinivasan, Farmington Hills, MI (US); Louis J. Serrano, Los Gatos, CA (US); Xiaoping Cai, Fremont, CA (US); J. Steven Kolhouse, Columbus, IN (US); Avra Brahma, Fishers, IN (US); Adrian P. Dale, Columbus, IN (US)

(73) Assignees: Tula Technology, Inc., San Jose, CA (US); Cummins, Inc., Columbus, IN (US)

( * ) Notice: Subject to any disclaimer, the term of this patent is extended or adjusted under 35 U.S.C. 154(b) by 0 days.

(21) Appl. No.: 17/186,979

(22) Filed: Feb. 26, 2021

(65) Prior Publication Data
US 2021/0348573 A1    Nov. 11, 2021

Related U.S. Application Data

(60) Provisional application No. 63/142,729, filed on Jan. 28, 2021, provisional application No. 63/072,378, (Continued)

(51) Int. Cl.
*F02D 41/00*    (2006.01)
*F02M 26/05*    (2016.01)
(Continued)

(52) U.S. Cl.
CPC ......... *F02D 41/0087* (2013.01); *F02M 26/05* (2016.02); *F02D 37/02* (2013.01);
(Continued)

(58) Field of Classification Search
CPC ................. F02D 41/0087; F02D 37/02; F02D 2041/0012; F02D 2250/18;
(Continued)

(56) References Cited

U.S. PATENT DOCUMENTS 4,398,525 A * 8/1983 Ahrns ..................... F02M 26/56
                                                        123/568.32
5,562,086 A * 10/1996 Asada ................. F02D 41/0087
                                                        123/568.21
(Continued)

FOREIGN PATENT DOCUMENTS

JP    2000-170562    6/2000
JP    2009-191643    8/2009
(Continued)

OTHER PUBLICATIONS

International Search Report and Written Opinion dated Jul. 22, 2021 from International Application No. PCT/US2021/019936.
(Continued)

*Primary Examiner* — Sizo B Vilakazi
*Assistant Examiner* — Brian R Kirby
(74) *Attorney, Agent, or Firm* — Beyer Law Group LLP

(57) ABSTRACT

Managing firing fraction transitions of a variable displacement internal combustion engines by (a) avoiding transport delays in an Exhaust Gas Recirculation (EGR) feed by starting movement of an EGR valve position after a decision to transition to a new firing fraction has been made, but prior to the start of the transition and (b) adjusting the EGR valve as needed during the transition so as to maintain an EGR fraction within a predetermined range during the transition.

(Continued)

By performing both (a) and (b), spikes of nitrous oxide ($NO_x$) and/or hydrocarbon emissions are reduced or altogether eliminated during the transition.

38 Claims, 10 Drawing Sheets

Related U.S. Application Data filed on Aug. 31, 2020, provisional application No. 63/020,766, filed on May 6, 2020.

(51) Int. Cl.

| | | |
|---|---|---|
| *F02M 26/23* | (2016.01) | |
| *F02M 37/02* | (2006.01) | |
| *F02M 26/43* | (2016.01) | |
| *F02D 37/02* | (2006.01) | |

(52) U.S. Cl.
CPC .. *F02D 2041/0012* (2013.01); *F02D 2250/18* (2013.01); *F02M 26/23* (2016.02); *F02M 26/43* (2016.02)

(58) Field of Classification Search
CPC ........... F02D 2041/1431; F02D 41/005; F02D 41/0065; F02M 26/05; F02M 26/23; F02M 26/43
See application file for complete search history.

(56) References Cited

U.S. PATENT DOCUMENTS

| | | | |
|---|---|---|---|
| 5,921,224 A * | 7/1999 | Sinnamon | F02D 41/0077 |
| | | | 123/568.21 |
| 6,802,302 B1 * | 10/2004 | Li | F02M 26/47 |
| | | | 123/568.21 |
| 7,577,511 B1 | 8/2009 | Tripathi et al. | |
| 7,849,835 B2 | 12/2010 | Tripathi et al. | |
| 7,886,715 B2 | 2/2011 | Tripathi et al. | |
| 7,954,474 B2 | 6/2011 | Tripathi et al. | |
| 8,099,224 B2 | 1/2012 | Tripathi et al. | |
| 8,131,445 B2 | 3/2012 | Tripathi et al. | |
| 8,131,447 B2 | 3/2012 | Tripathi et al. | |
| 8,616,181 B2 | 12/2013 | Sahandiefanjani et al. | |
| 8,701,628 B2 | 4/2014 | Tripathi et al. | |
| 8,904,787 B2 * | 12/2014 | Styles | F02M 26/05 |
| | | | 60/605.2 |
| 9,086,020 B2 | 7/2015 | Pirjaberi et al. | |
| 9,120,478 B2 | 9/2015 | Carlson et al. | |
| 9,200,587 B2 | 12/2015 | Serrano | |
| 9,239,037 B2 | 1/2016 | Carlson et al. | |
| 9,267,454 B2 | 2/2016 | Wilcutts et al. | |
| 9,273,643 B2 | 3/2016 | Carlson et al. | |
| 9,291,106 B2 | 3/2016 | Switkes et al. | |
| 9,328,672 B2 | 5/2016 | Serrano et al. | |
| 9,541,050 B2 | 1/2017 | Tripathi et al. | |
| 9,650,971 B2 | 5/2017 | Pirjaberi et al. | |
| 9,664,130 B2 | 5/2017 | Wilcutts et al. | |
| 9,945,313 B2 | 4/2018 | Kotwicki et al. | |
| 10,072,592 B2 | 9/2018 | Younkins et al. | |
| 10,247,121 B2 | 4/2019 | Shost et al. | |
| 2003/0226544 A1 * | 12/2003 | Nakamori | F02P 5/1516 |
| | | | 123/568.21 |
| 2008/0202118 A1 * | 8/2008 | Ide | F02M 26/60 |
| | | | 60/611 |
| 2011/0083649 A1 * | 4/2011 | Miyashita | F02D 41/0055 |
| | | | 123/568.19 |
| 2012/0023937 A1 * | 2/2012 | Styles | F02D 41/005 |
| | | | 60/605.2 |
| 2013/0291816 A1 | 11/2013 | Serrano et al. | |
| 2014/0261316 A1 * | 9/2014 | Shost | F02D 17/02 |
| | | | 123/349 |
| 2014/0311446 A1 * | 10/2014 | Whitney | F02D 41/0002 |
| | | | 123/344 |
| 2015/0025723 A1 * | 1/2015 | Glugla | B60W 20/15 |
| | | | 180/65.265 |
| 2015/0051809 A1 * | 2/2015 | Glugla | F02D 41/005 |
| | | | 123/406.12 |
| 2015/0128917 A1 * | 5/2015 | Surnilla | F02D 41/005 |
| | | | 123/568.16 |
| 2016/0017836 A1 * | 1/2016 | Tanaka | F23Q 7/001 |
| | | | 701/104 |
| 2016/0146136 A1 * | 5/2016 | Surnilla | F02D 15/00 |
| | | | 123/481 |
| 2017/0370308 A1 * | 12/2017 | Hashemi | F02D 13/06 |
| 2018/0179970 A1 * | 6/2018 | Serrano | B60W 10/023 |
| 2022/0018297 A1 * | 1/2022 | Blumreiter | F02D 41/1454 |

FOREIGN PATENT DOCUMENTS

| | | | | |
|---|---|---|---|---|
| JP | 2010275918 A * | 12/2010 | | F02D 21/08 |
| JP | 2019044593 A * | 3/2019 | | |
| WO | WO 2010/006311 | 1/2010 | | |
| WO | WO 2011/085383 | 7/2011 | | |
| WO | WO-2014080523 A1 * | 5/2014 | | F02D 21/08 |
| WO | WO-2014095215 A1 * | 6/2014 | | F01N 11/00 |
| WO | WO 2016/077246 | 5/2016 | | |

OTHER PUBLICATIONS

Choi et al., "Investigation of Technologies to Improve Fuel Efficiency in Turbo GDI Engine: CDA, Miller-Cycle With Valve Event, Water Injection, LP EGR and High Compression Ratio", https://researchgate.net/publication/335060321, Aug. 9, 2019.

* cited by examiner

EXHAUST GAS RECIRCULATION FLOW CONTROL FOR REDUCING EMISSIONS WITH VARIABLE DISPLACEMENT INTERNAL COMBUSTION ENGINES

CROSS REFERENCE TO RELATED APPLICATIONS

This application claims priority of U.S. Provisional Patent Application No. 63/020,766, filed May 6, 2020; U.S. Provisional Patent Application No. 63/072,378, filed Aug. 31, 2020; and U.S. Provisional Patent Application No. 63/142,729 filed Jan. 28, 2021, all of which are incorporated by reference herein for all purposes.

FIELD OF THE INVENTION

The present invention relates to variable displacement internal combustion engines, and more specifically, to controlling EGR flow to prevent spikes in $NO_x$ and/or hydrocarbon emissions during firing fraction transitions of a variable displacement engine.

BACKGROUND

Most vehicles in operation today are powered by internal combustion (IC) engines. Internal combustion engines typically have multiple working chambers (i.e., cylinders) where combustion occurs. The power generated by the engine depends on a combination of (a) the number of cylinders and (b) the amount of fuel and air that is delivered to each cylinder. During everyday driving, the engine of a vehicle typically operates over a wide range of torque demands and operating speeds to meet varying driving conditions.

Fuel efficiency of internal combustion engines can be substantially improved by varying the engine displacement. This allows for the full torque to be available when required, yet can significantly reduce pumping losses and improve thermal efficiency by using a smaller displacement when full torque is not required. Varying the engine displacement by deactivating cylinders to avoid pumping air through the cylinder during skipped working cycles also allows better control of exhaust gas temperature, which may improve the efficacy of emission control systems.

Two known approaches for implementing variable displacement engines include (a) the deactivation of a group of one or more cylinders and (b) skip fire engine control. In either case, operation of the engine at less than full displacement can be expressed in terms of a firing fraction. For instance when an eight cylinder engine is firing two, three, four or five cylinders, the firing fraction is ¼, ⅜ ½ and ⅝ respectively.

With both spark ignition engines and compression ignition engines, the use of an Exhaust Gas Recirculation (EGR) system is a known approach for reducing $NO_x$ emissions. With variable displacement engines, switching from one firing fraction to another firing fraction can be problematic. During such transitions, the volume of needed EGR flow may near instantly change. For instance, at a higher fraction, a larger volume of EGR gas flow may be needed because more cylinders are fired. Conversely, a smaller volume of EGR gas flow may be needed for a low firing fraction because fewer cylinders are fired. Changes in EGR flow, however, are not instantaneous. Due to transport delays of EGR gas flow from the exhaust manifold to the intake manifold, the actual EGR fraction (EGR mass/total charge mass) may fall outside of an ideal predetermined range during firing fraction transitions. As a result, either too much or too little exhaust gas is present in the intake manifold, resulting in spikes in either $NO_x$ and/or hydrocarbon emissions during such transitions.

An ability to better control the coordination of firing fraction and EGR flow to prevent spikes in $NO_x$ and/or hydrocarbons during firing fraction changes of a variable displacement engine is therefore needed.

SUMMARY OF THE INVENTION

The present invention relates to coordinating changes to the firing fraction with fresh air and EGR flow to prevent spikes in NOx and/or hydrocarbons emissions during firing fraction transitions of a variable displacement engine.

In a non-exclusive embodiment, after a decision to change the firing fraction is made, an Exhaust Gas Recirculation (EGR) valve position is moved prior to starting the transition to the new firing fraction. By moving the EGR valve prior to starting the firing fraction transition, the effects of transport delays in the EGR feed are reduced or altogether eliminated. As a result, hydrocarbon and/or $NO_x$ emissions are reduced or eliminated as well.

In another non-exclusive embodiment, during firing fraction transitions, the EGR valve position is moved as needed so as to maintain an EGR fraction within an ideal predetermined range. By maintaining the EGR fraction within the ideal predetermined range, spikes in hydrocarbon and/or $NO_x$ emissions are further reduced or eliminated during the transition.

In yet another non-exclusive embodiment, a method of controlling a transition of an engine between different firing fractions is described. The engine has a plurality of working chambers and an exhaust gas recirculation system arranged to divert a portion of the engine's exhaust gas back into the plurality of the working chambers. While the engine is operating at a first firing fraction, a request to transition to a target second firing fraction that is different than the first firing fraction is received. The engine then transitions from the first firing fraction towards the target second firing fraction by altering a commanded firing fraction from the first firing fraction towards the target second firing fraction. In conjunction with the transition between the different firing fractions, a commanded exhaust gas recirculation valve position is changed to facilitate operation at the target second firing fraction, wherein a value of the firing fraction between the first firing fraction and target second firing fraction is based at least in part on an EGR fraction.

BRIEF DESCRIPTION OF THE DRAWINGS

The invention and the advantages thereof may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION

Figure 1:
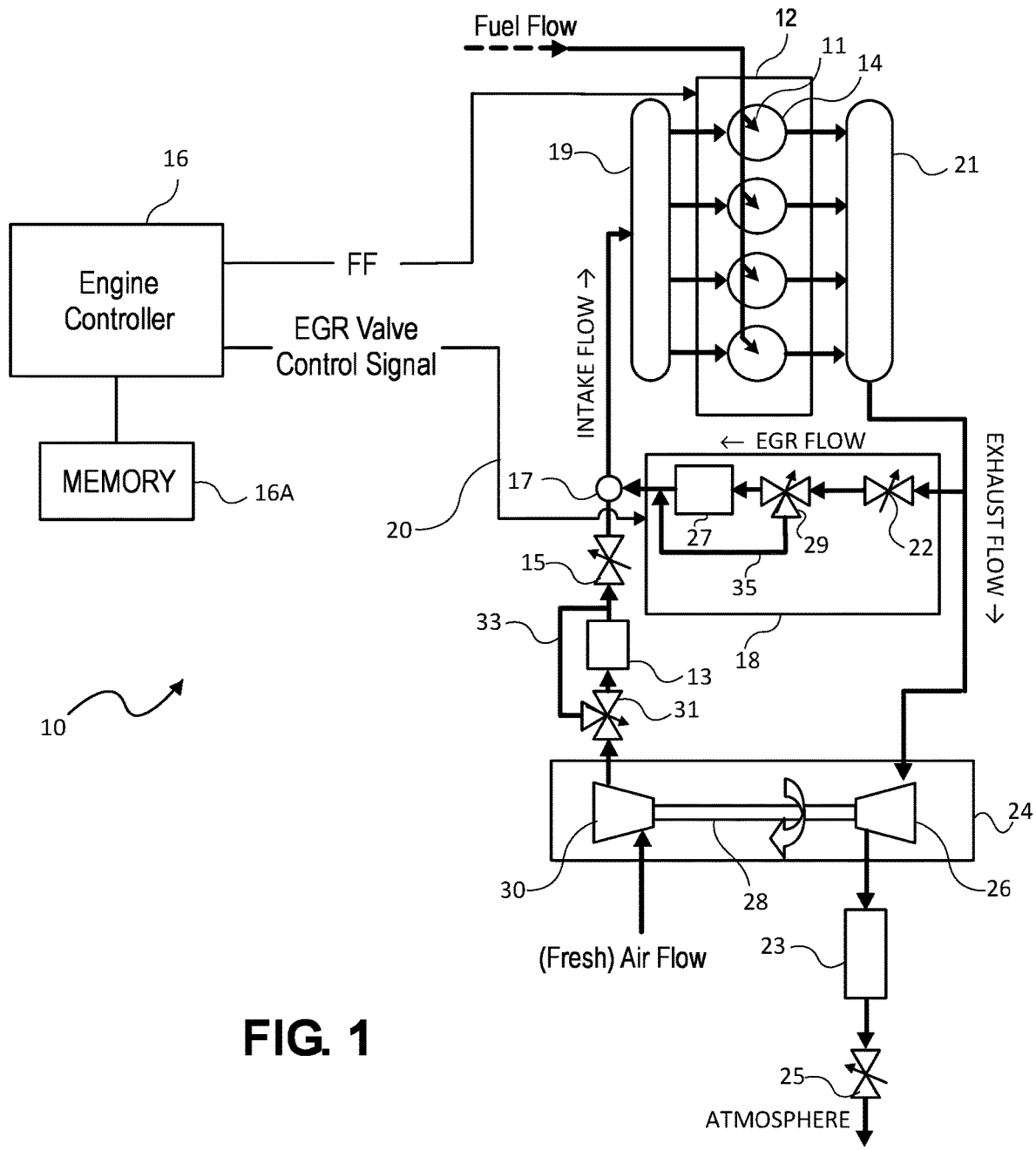
FIG. 1 is logic diagram showing an engine system with an engine controller controlling operation of a variable displacement engine and an Exhaust Gas Recirculation (EGR) system in accordance with a non-exclusive embodiment of the invention.

With both spark ignition (SI) engines and compression ignition (CI) engines, the use of an Exhaust Gas Recirculation (EGR) system is a known approach for reducing $NO_x$ emissions. $NO_x$ forms primarily when a mixture of nitrogen and oxygen is subjected to high temperature. EGR systems, which operate by re-circulating a portion of the exhaust gas hack to the cylinders of the engine, reduce $NO_x$ emissions several ways. First, the EGR flow dilutes the amount of oxygen in the air intake stream into the cylinders. For SI engines, this means the amount of fuel inducted into the cylinder must be reduced to maintain stoichiometric combustion conditions. For CI engines, excessive EGR flow may result in incomplete combustion because there may be insufficient oxygen to combust all of the fuel in the working chamber. With incomplete combustion, hydrocarbon emissions tend to increase. Second, for both SI and CI engines, the presence of exhaust gases during combustion act as an absorbent of combustion generated heat, which reduces peak temperatures within the cylinders, reducing $NO_x$ emissions. Thus, for both SI and CI engines, maintaining an EGR fraction in relation to the total charge within a predetermined range, is critical in preventing excess $NO_x$ and/or hydrocarbon emissions.

The present invention relates to coordinating changes to the firing fraction with fresh air and EGR flow to prevent spikes in $NO_x$ and/or hydrocarbons emissions during firing fraction transitions of a variable displacement engine. In vehicle applications, a variable displacement engine may operate at one or more reduced levels of effective displacement to meet the required torque demand in a more fuel-efficient manner. Each displacement level may be characterized by a firing fraction, which indicates the ratio of fired firing opportunities to total firing opportunities. Transitions between firing fractions are often a source of NVH (Noise, Vibration, and Harshness) due to the change in the firing density and noxious emissions due to concomitant changes in combustion parameters. Generally, NVH is minimized by gradually spreading out the firing fraction transition over a number of firing opportunities, but not spreading it excessively.

Air, fuel, and EGR fraction control during a firing fraction transition is complex because of the transport delays associated with changing these combustion parameters. Also, different engine types may have different constraints. For example, in SI engines it is desirable to maintain a stoichiometric air/fuel ratio through the transition. Compression ignition engines do not have a fixed air/fuel stoichiometry constraint, but they may be constrained to maintain a desired EGR fraction through the transition to minimize emission of noxious pollutants. Also, for a given engine load and speed different firing fractions may have a different desired EGR fraction, which further complicates engine control during a firing fraction transition. The inherent transport delays associated with EGR gas flow from the exhaust manifold to the intake manifold and fresh air flow from the air intake to the intake manifold make the control problem complex.

After a decision to change the firing fraction is made, an Exhaust Gas Recirculation (EGR) valve position may be moved prior to starting the transition to the new firing fraction. By moving the EGR valve in anticipation of the firing fraction transition, the effects of transport delays in the EGR flow are reduced or altogether eliminated. In addition, during the actual firing fraction transition, the EGR valve position may be moved as needed so as to maintain an EGR fraction within a predetermined range. The EGR valve position may be adjusted in a feed forward manner in anticipation of and during the transition in firing fraction. The transition in the firing fraction may be made gradual to substantially match the change in the EGR fraction. The firing fraction may dwell at one or more intermediate firing fractions that have favorable NVH characteristics during the transition. By controlling the firing fraction and EGR fraction during the transition spikes in $NO_x$ and/or hydrocarbons emissions are reduced or largely eliminated during the transition.

Air-Fuel Ratios

The air-fuel ratio in a cylinder is an important parameter in both SI and CI engines. If exactly enough air is provided to completely burn all the fuel without any remaining oxygen, the ratio is known as "stoichiometric". The air/fuel ratio of the air/fuel mixture combusted in a SI or CI engine is generally different. In SI engines, the air/fuel ratio within the working chamber is generally controlled at or near a stoichiometric ratio so that under ideal combustion conditions all oxygen in the air/fuel mixture is consumed and no unoxidized hydrocarbons remain. There is consequently little or no oxygen in the combustion exhaust gas, which is a requirement for operation of three-way catalysts, which is typically used in the aftertreatment system of a SI engine. By contrast CI engines generally operate over a wide range of air/fuel ratios. The air/fuel ratio is generally lean so that not all oxygen present in working chamber is consumed during combustion. Therefore, there is almost always oxygen always present in the exhaust gas, which would damage the oxidation/reduction balance required for operation of a three-way catalyst. As a result, different types of aftertreatment elements are used with CI engines.

Ratios lower than stoichiometric are considered "rich", meaning the ratio defines more fuel than can be burned by the provided amount of air. Rich mixtures can generate more power and burn cooler, but at the expense of efficiency.

Ratios higher than stoichiometric, on the other hand, are considered "lean", meaning the ratio defines an air-fuel mixture with more oxygen than can be combusted by the fuel. Lean air-fuel ratios do not effectively use common three-way catalysts in an exhaust aftertreatment system, since excess oxygen is typically present in the exhaust gas.

Spark ignition engines are generally operated with a stoichiometric fuel/air ratio and have their output torque controlled by controlling the mass air charge (MAC) in a cylinder. Mass air charge is generally controlled using a throttle to reduce the intake manifold absolute pressure (MAP). A spark ignition engine may also use a supercharger or turbocharger to boost the intake manifold pressure above atmospheric pressure.

Compression ignition engines typically control the engine output torque by controlling the amount of fuel injected (hence changing the air/fuel ratio), not air flow through the engine. Engine output torque is reduced by adding less fuel to the air entering the cylinder (i.e. running the engine leaner). Compression ignition engines generally run with a lean air/fuel ratio. For example, a Diesel engine, which is the most common type of compression-ignition engine, may typically operate with air/fuel ratios with a range of 16 to 160 compared to a stoichiometric air/fuel ratio of approximately 14.6. Some, usually older, Diesel engines generally do not use a throttle, and can instead use a turbocharger to control air flow into the engine. Compression ignition engines may also be further classified based on their fuel and how the fuel is mixed with air within the cylinder. Several common types of compression ignition engines include a stratified charge compression ignition engine (e.g., most conventional Diesel engines, and abbreviated as SCCI), a premixed charge compression ignition (PCCI) engine, a reactivity-controlled compression ignition (RCCI) engine, a gasoline compression ignition engines (GCI) engine, and a homogeneous charge compression ignition (HCCI) engine.

Variable Displacement Engines

The most common method today of implementing a variable displacement engine is to deactivate a group of one or more cylinders substantially simultaneously. Commercially available variable displacement engines today typically support only a relatively small number of displacements. For instance, with an eight cylinder engine, groups of two, four or six cylinders may be deactivated, resulting in effective reduced displacements of seventy five, fifty and twenty five percent of the full displacement of the engine respectively. The effective displacement of a variable displacement engine can be expressed in terms of a firing fraction. For example, full displacement is represented by the firing fraction of 1.0, while effective reduced displacements of seventy-five, fifty, and twenty-five percent are represented by the fractions ¾, ½, ¼ respectively.

Another engine control approach that varies the effective displacement of an engine is referred to as "skip fire" engine control. In general, skip fire engine control contemplates selectively skipping the firing of certain cylinders during selected firing opportunities. Thus, a particular cylinder may be fired during one engine cycle, skipped during the next engine cycle and then selectively skipped or fired during the next. From an engine cycle perspective, skip fire control may have different sets of cylinders fired during sequential engine cycles to generate the same average torque, whereas conventional variable displacement operation deactivates the same group of cylinder(s). As a result, skip fire control offers the advantage of finer control of the effective displacement of an engine. For example, firing every third cylinder in a 4-cylinder engine would provide an effective reduction of one third or a firing fraction of 0.333 of the full engine displacement, which is a fractional displacement that is not obtainable by simply deactivating a group of cylinders. A further advantage of skip-fire engines is that changes to the firing fraction can happen gradually. For example, changing from a firing fraction of ½ to a firing fraction of 1 can be spread of many firing opportunities. This technique has proved useful in spark ignition engines to match the torque requirements of the engine to the pressure of the intake manifold while meeting requirements on emissions and maintaining acceptable levels of Noise, Vibration and Harshness (NVH).

Engine Control

FIG. 1 illustrates an engine system 10 which includes, a variable displacement engine 12, having multiple cylinders 14 where combustion occurs. In the embodiment shown, the engine 12 includes four (4) cylinders 14. It should be understood that the engine 12 as illustrated is merely exemplary and may include either fewer or more cylinders 14, such as, but not limited to 2, 3, 6, 8, 10, 12, or 16 cylinders. The engine 12 is controlled by an engine controller 16.

The engine system 10 may include various elements in the intake and exhaust paths of the engine 12. On the intake path, fresh air may be drawn into a compressor 30, which is part of a turbocharger system 24. The output of the compressor 30 may be directed to a charge cooler bypass valve 31, which allows air to flow into an intercooler or charge air cooler 13 or to be diverted in a bypass 33 around the charge air cooler 13. The charge air cooler 13 lowers the temperature of the compressed air, which allows more air to be pumped through the engine increasing the engine's maximum torque output. The inducted air then may flow through a throttle valve 15 and then into an exhaust gas recirculation (EGR) mixer 17 where exhaust gas may be introduced into the incoming fresh air. From the exhaust gas recirculation mixer 17 the air/EGR mixture may flow into an intake manifold 19 and from there into the engine's cylinders 14. Intake valves (not shown in FIG. 1) open and close to intermittently allow and block gas flow between the cylinders 14 and intake manifold 19. Fuel may be injected into each cylinder 14 by a fuel injector 11. The mixture of air, fuel, and possibly recirculated exhaust gas may combust in the cylinder 14 during an expansion or power stroke of a cylinder working cycle. The exhaust gases then may flow through an exhaust valve, (not shown in FIG. 1), which intermittently closes and opens to an exhaust manifold 21. From the exhaust manifold 21 a portion of the exhaust gas flow may be diverted by an Exhaust Gas Recirculation (EGR) system 18. The exhaust gas not flowing through the EGR system may then flow through a turbine 26 that is part of the turbocharger system 24. The exhaust gas flowing through the turbine 26 provides power to spin the compressor 30. The turbocharger system 24 may include a waste gate or variable vane or geometry turbine (not shown in FIG. 1) to control the amount of power extracted from the flowing exhaust gases. After leaving the turbocharger system 24 the flow may continue through an aftertreatment system 23 that removes noxious pollutants in the exhaust gas. The exhaust gas may then flow through an optional exhaust throttle 25 and then out a tailpipe into the atmosphere.

The EGR system 18 may include an EGR valve 22 that adjustably controls the flow rate of exhaust gas back into the intake system. Also, in the EGR system 18 may be an exhaust gas cooler 27 that cools the hot exhaust gases before introducing them into the intake system. An exhaust gas cooler bypass valve 29 allows some or all of the recirculated exhaust gas to be diverted around the exhaust gas cooler 27 in an exhaust gas bypass 35.

The engine system 10 may include various sensors (not shown in FIG. 1 for clarity). These sensors may be positioned at various locations on the engine 12, the intake system and the exhaust system. For example, the intake manifold 19 may have a pressure sensor, a temperature sensor, and an oxygen sensor. The exhaust manifold 21 may have a temperature sensor and a pressure sensor. There may be a mass flow sensor and an oxygen sensor positioned at the outlet of EGR system 18 before the exhaust gas enters the EGR mixer 17. There may be a mass flow sensor on the inlet to the compressor. There may be a temperature sensor positioned to monitor the aftertreatment system 23 temperature. There may be $NO_x$ sensors in the exhaust system both prior to and after the aftertreatment system 23. There may be a waste gate or turbocharger vane position sensor incorporated into the turbocharger system 24. These sensors may all provide signals to the engine controller 16 that allow the engine controller 16 to operate the engine 12 in an appropriate manner. The sensor signals may be used as part of a feedback loop in engine control. It should be appreciated that not all engine systems 10 use all of the above described sensors and in some cases additional sensors may be used.

The engine 12 can be a compression ignition engine (CI), a spark-ignition (SI) engine, an engine that combines spark ignition with compression ignition, or an engine that ignites the air fuel mixture with a different technology.

The engine 12 can be any type of engine that is capable of selectively operating at full displacement or one or more reduced displacements.

In one embodiment, the engine 12 can be a "conventional" variable displacement engine where a group or bank of one or more cylinders may be selectively deactivated by the controller 16 to reduce the effective displacement of the engine to less than full displacement. For example, with an eight-cylinder engine, groups of two, four or six cylinders may be selectively deactivated. The effective displacement of the engine 12 can be expressed in terms of a firing fraction. For instance, when a conventional variable displacement engine is operating with two, four, or six cylinders deactivated, the firing fractions are ¾, ½ or ¼, respectively.

In another embodiment, the engine 12 can be skip fired controlled by the controller 16. Skip fire engine control contemplates selectively skipping the firing of certain cylinders 14 during selected firing opportunities. Thus, for a given effective engine displacement that is less than the full displacement, a particular cylinder 14 may be successively fired during one firing opportunity, skipped during the next firing opportunity and then selectively skipped or fired during the next firing opportunity. From an overall engine perspective, skip fire control sometimes results in successive engine cycles having a different pattern of skipped and fired cylinders. This is contrasted with conventional variable displacement engine operation in which a fixed set of the cylinders are deactivated during certain low-load operating conditions. The firing sequence may also be expressed as a firing fraction or firing density, either of which indicates a ratio of fired firing opportunities to total firing opportunities.

With skip fire, much finer or refined engine control by the engine controller 16 is possible than with conventional variable displacement engines. By way of comparison, fractions such as ⅓ may be implemented using skip fire engine control, but cannot be implemented with a conventional 4-cylinder variable displacement engine. For instance, a commercially available skip fire controller offered by the assignee of the present application provides for seventeen (17) different firing fractions, each indicative of a different reduced effective engine displacement.

Skip fire engine control is described in U.S. Pat. Nos. 7,954,474; 7,886,715; 7,849,835; 7,577,511; 8,099,224; 8,131,445; 8,131,447; 8,616,181; 8,701,628; 9,086,020; 9,120,478; 9,200,587; 9,650,971; 9,328,672; 9,239,037; 9,267,454; 9,273,643; 9,664,130; 9,945,313; and 9,291,106; and U.S. patent application Ser. No. 13/886,107; each of which is incorporated herein by reference in its entirety for all purposes.

With certain implementations of skip fire engine control by the engine controller, a decision to fire or not fire a given cylinder of an engine is made dynamically, meaning on a firing opportunity-by-firing opportunity or an engine cycle by engine cycle basis. In other words, prior to each successive firing opportunity, a decision is made to either fire or skip the firing opportunity. In various embodiments, the firing sequence is determined on a firing opportunity by firing opportunity basis by using a sigma delta, or equivalently a delta sigma, converter. Such a skip fire control system may be defined as dynamic skip fire control or "DSF". For more details on DSF, see U.S. Pat. Nos. 7,849,835, 9,086,020 and 9,200,575, 10,247,121, each incorporated by reference herein for all purposes.

As used herein the term "firing fraction" should thus be broadly interpreted and is applicable to any type of variable displacement engine, including but not limited to, conventional variable displacement engines, skip fire controlled engines and DSF controlled engines.

The engine controller 16 is responsible for, among other tasks, generating firing fractions ("FF") for:

(a) Operating the engine 12 at one of multiple different displacements as needed to meet varying torque requests; and (b) Controlling the EGR system 18, by generating an EGR valve control signal 20, for controlling a position of an EGR valve 22. In various embodiments, the EGR valve control signal 20 may be generated in either the time domain or the crank angle domain.

In non-exclusive embodiments, the engine controller 16 can be a sigma-delta engine controller. For more details on sigma-delta type engine controllers, see U.S. Pat. Nos. 9,541,050, 9,086,020, and 10,072,592, all of which are incorporated by reference herein for all purposes.

EGR Control

By adjusting the position of the EGR valve 22, the volume of the EGR flow from the exhaust manifold to the intake manifold of the engine 14 can be controlled. As described in detail below, control of the position of the EGR valve 22 may be used to eliminate spikes in hydrocarbon and/or $NO_x$ emissions during firing fraction transitions.

The memory 16A may be any type of memory, including volatile or non-volatile memory, and is used to store data useful for determining (a) a firing fraction for operating the engine 12 and (b) a position for an EGR valve 14 of the EGR system 18 for each firing fraction. Such data may include tables, models derived from empirical data, algorithms, or any combination thereof.

The EGR system 18 operates to recirculate a portion of the combusted exhaust gas back to the cylinders 14 of the engine 12. The amount of recirculation flow is selectively controlled by the variable EGR valve 22. During operation, the engine controller 16 generates the EGR valve control signal 20 that adjusts the EGR valve 22 to a more open or closed position. As a result, the volume of exhaust gas that is recirculated back to the cylinders 14 can be controlled for the purpose of mitigating or reducing hydrocarbon and/or $NO_x$ emissions.

The recirculation tends to dilute the fresh air intake stream into the cylinder 14 with gases inert to combustion or at least having a lower oxygen level than fresh air. The exhaust gases act as absorbents of combustion generated heat and reduce peak temperatures within the cylinders 14. As a result, $NO_x$ emissions are typically reduced. In a compression-ignition Diesel engine for instance, the exhaust gas replaces some of the oxygen in the pre-combustion mixture. Since $NO_x$ forms primarily when a mixture of nitrogen and oxygen is subjected to high temperature, the lower combustion temperatures and reduction in the amount of oxygen in the working chamber cause a reduction in the amount of generated $NO_x$. However, if too much exhaust gas is present, then complete combustion within the fired cylinders 14 may not occur. As a result, a spike in non-combusted hydrocarbons may occur.

The optional turbocharger system 24 includes an exhaust turbine 26, a shaft 28, and a compressor wheel 30. The compressor wheel 30 is part of a compressor that serves to increase pressure in the intake manifold above atmospheric pressure. An optional cooler (not illustrated) may also be provided to cool the intake air allowing a higher Mass Air Charge or "MAC". Air from the intake manifold is inducted into a cylinder 14 through one or more intake valve(s) on each cylinder. Boosting the supply of air into the cylinders 14 allows for the generation of more power compared to a naturally aspirated engine. With more air, proportionally more fuel can be input into the cylinders 14.

In optional embodiments, a supercharger or a twin-charger may be used to boost the air intake as well. The key difference between a turbocharger and a supercharger is that a supercharger is mechanically driven by the engine, often through a belt connected to the crankshaft, whereas a turbocharger is powered by a turbine driven by the exhaust gas of the engine. Compared with a mechanically driven supercharger, turbochargers tend to be more efficient, but less responsive. A twin-charger refers to an engine with both a supercharger and a turbocharger.

The present application is described primarily in the context of a four cylinder internal combustion engine suitable for use in motor vehicles. It should be understood, however, that the present application as described herein may be used with any type of internal combustion engine, regardless of the type of combustion and/or may be used with any engine regardless of the number of cylinders, including 1, 2, 3, 4, 5, 6, 8, 10, 14 cylinders or engines with more or fewer cylinders specifically recited herein. In addition, the internal combustion engine may use any type of combustible fuel, including but not limited to gasoline, diesel, ethanol, methanol, natural gas, or any combination thereof. Furthermore, the internal combustion engine may rely on various types of combustion and/or fuel charges, including but not limited to compression ignition, spark ignition, a stratified fuel charge, a homogeneous fuel charge, and a partial homogeneous charge. In addition, any of the engines described herein may be used for virtually any type of vehicle—including cars, trucks, locomotives, ships, boats, construction equipment, aircraft, motorcycles, scooters, etc.; and virtually any other application that involves the firing of cylinders in an internal combustion engine.

Delta ($\Delta P$) vs. Firing Fraction

Figure 2:
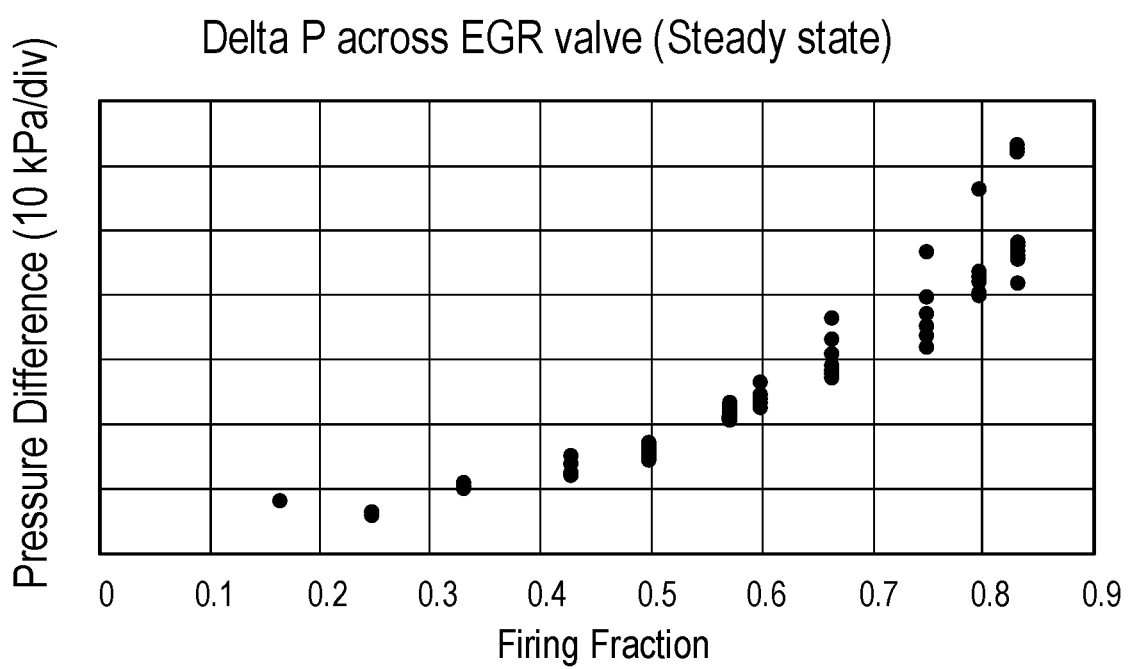
FIG. 2 is an exemplary plot illustrating how differential pressure (ΔP) across an EGR valve of the EGR system changes when the firing fraction of a variable displacement engine changes.

Referring to FIG. 2, an exemplary plot 40 showing how a pressure differential ($\Delta P$) across the EGR valve 22 of the EGR system 18 changes with respect to firing fraction changes is illustrated. Along the vertical axis, the pressure differential $\Delta P$ is plotted versus a range of different firing fractions along the horizontal axis.

With most variable displacement engines that rely on EGR flow, the EGR fraction is ideally maintained within a predefined range. For instance, with a known internal combustion engine, the predefined range is 25-30%, which corresponds to 25-30% of a working chamber charge being exhaust gas and 75-70% of the working chamber charge being fresh air. It should be understood that this particular range is exemplary. With different engines, the range will widely vary. Regardless of the ideal or predetermined range for a given engine, spikes in $NO_x$ and/or hydrocarbon emissions can be avoided if all combustion events are conducted with the proper ratio. If the ideal ratio is not present for a given combustion event, then spikes in either $NO_x$ and/or hydrocarbon emissions are likely to occur.

The total volume of EGR flow to the intake manifold of the engine 12 needed to maintain the predetermined ratio varies significantly depending on the firing fraction. With high firing fractions, a relatively high volume flow of EGR is needed, while a smaller volume of EGR flow is needed with smaller firing fractions. In other words, when a relatively large number of cylinders 14 are being fired, a larger volume of EGR flow is needed so that the predetermined ratio is present for all the combustion events. On the other hand with lower firing fractions, less EGR flow is needed since there are fewer combustion events.

As illustrated in the plot 40, the pressure ($\Delta P$) across the EGR valve 22 gradually increases with larger firing fractions. When operating at high firing fractions, a relatively large volume of exhaust gas is being inducted into the cylinders 14. As a consequence, the pressure differential ($\Delta P$) across the EGR valve 22 is larger. With lower firing fractions, a smaller volume of gases is being inducted into the engine. As a result, the differential pressure ($\Delta P$) across the EGR valve 22 is lower.

The engine controller 16 uses the EGR valve control signal 20 to control the position of the variable EGR valve 22. Based on the position, either a larger or smaller volume of exhaust gas is allowed to be recirculated to the intake of the engine 12. When in a more opened position, more EGR flow is allowed, while less exhaust gas is allowed to be recirculated when in a more closed position.

Changing the desired firing fraction at a fixed engine load/speed condition changes the desired fuel per cylinder which will change the desired EGR fraction. Higher firing fractions require a lower per cylinder load and lower firing fractions require a higher per cylinder load to generate the same engine torque output. In Diesel engines, high cylinder loads generally require a lower EGR fraction and a lower air/fuel ratio whereas low cylinder loads a higher EGR fraction and a higher air/fuel ratio. As a result, generally at a fixed engine load/speed condition, the engine controller 16 moves the EGR valve 22 to a more open position while operating at high firing fractions to allow more EGR flow and vice versa while operating at lower firing fractions.

During steady state operation, meaning the engine 12 is steadily operating at a given firing fraction, the EGR valve 22 is typically held in a corresponding static position and an adequate EGR flow is recirculated to the intake of the engine 12 so that all combustion events occur with the predetermined EGR fraction. When a decision to change the firing fraction is made, the volume of the EGR flow will need to be adjusted to maintain the predetermined EGR fraction for all combustion events at the new firing fraction. Due to limitation on how quickly the EGR valve can move and gas mixing and transport delays, the change of the EGR flow needed for the new firing fraction is not instantaneous. As a result, combustion events may result in spikes of either $NO_x$ or hydrocarbon emissions because the EGR fraction temporarily falls outside of the predetermined range.

As described in detail below, the controller 16 generates the EGR valve control signal 20 to accomplish at least two objectives:

(a) After a decision to change the firing fraction is made, the position of the Exhaust Gas Recirculation (EGR) valve 22 is moved prior to or in anticipation of starting the transition to the new firing fraction. By beginning to adjust the EGR valve prior to the start of the firing fraction transition, the effects of transport delays of the EGR flow are mitigated. The movement of the EGR valve adjustment may begin a predetermined number of engine revolutions before the scheduled start of the firing fraction transition. The predetermined number of revolutions may be two or less. Alternatively, the delay of the firing fraction adjustment relative to EGR valve adjustment may be based on a sensor signal, such as a measurement of engine speed. The delay may also be adjusted in real time based a feedback signal from one or more of the sensors.

(b) During the actual firing fraction transition, the EGR valve position is adjusted as needed so as to maintain an EGR fraction within the predetermined range.

By performing both (a) and (b), spikes in $NO_x$ and/or hydrocarbon emissions are reduced or largely eliminated during the firing fraction transitions.

For CI engines operating at full engine displacement, the EGR fraction and its behavior as a function of engine speed and load are somewhat different depending on the engine type because certification test cycles are different. For light duty engines (e.g. pick-up trucks), the EGR faction can be 50% or higher at idle and light loads and 0% at full load. For medium/heavy duty engines (e.g. semi-trucks), the EGR fraction can be as high as 35% at high speed medium load and 0% at low speed high load. Engines capable of operating at variable displacements will have more complex EGR fraction behavior, since firing fraction must be consider as an additional variable in determining the appropriate EGR fraction at a given engine speed and load.

Firing Fraction Transitions—Low to High

Figure 3A:
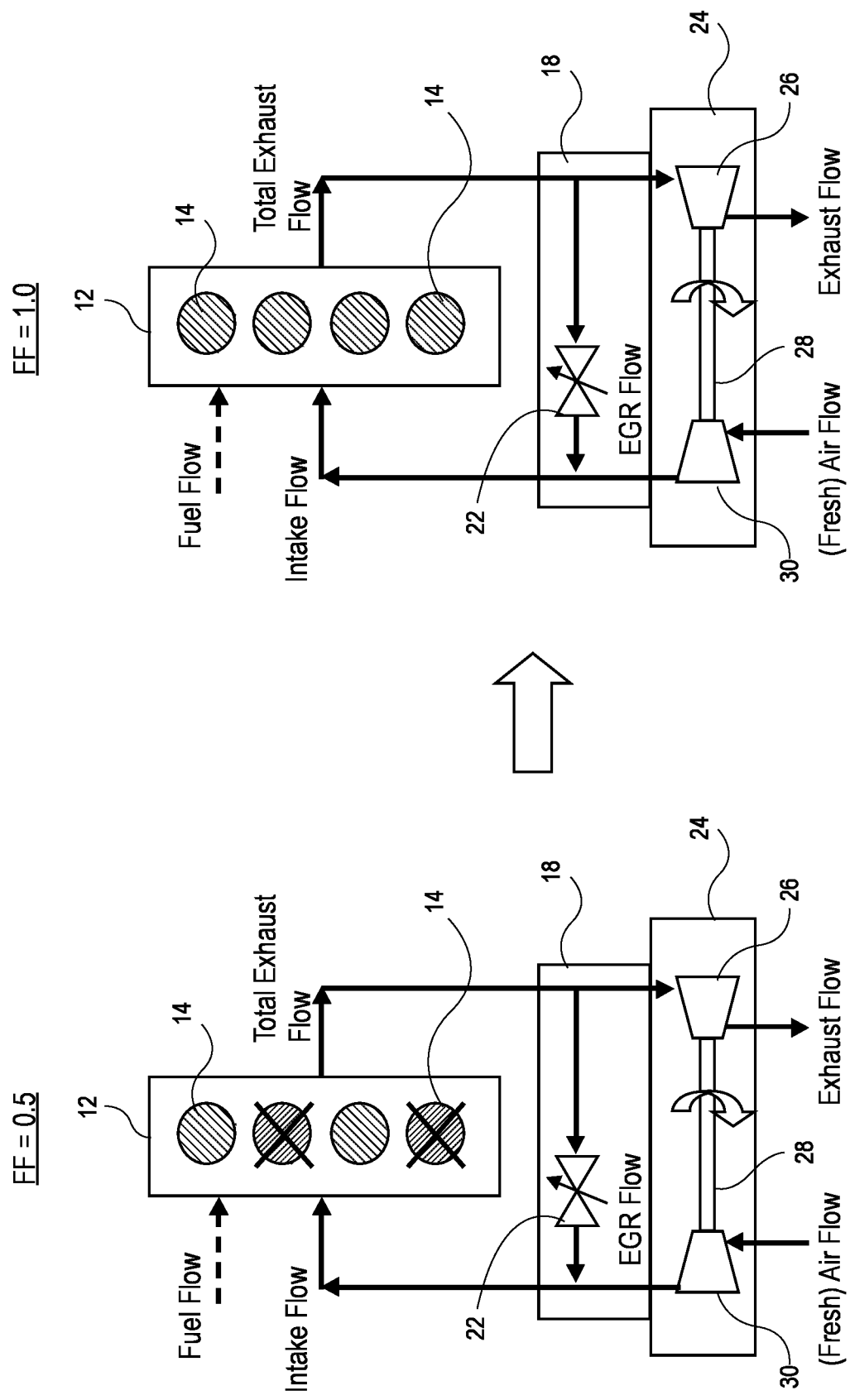
FIG. 3A is a diagram illustrating a low to a high firing fraction transition of an exemplary variable displacement engine in accordance with a non-exclusive embodiment of the invention.

Referring to FIG. 3A), a low to a high firing fraction transition of the variable displacement engine 12 is shown. In this particular example, the engine 12 includes four cylinders 14. As depicted on the left side of the drawing, the engine 12 is operating at a firing fraction of 0.5 (FF=0.5), which is signified by the "X" superimposed over two of the four cylinders 14. On the right side of the diagram, the engine 12 is shown after the firing fraction transition. In this case, the target firing fraction after the transition is 1 (FF=1). In other words, all four cylinders are fired. In various alternative embodiments, the engine 12 can be operated using any of the above viable displacement techniques, including selectively activating/deactivating groups of cylinders, skip fire engine control, dynamic skip fire control, or any other variable displacement type engine.

Figure 3B:
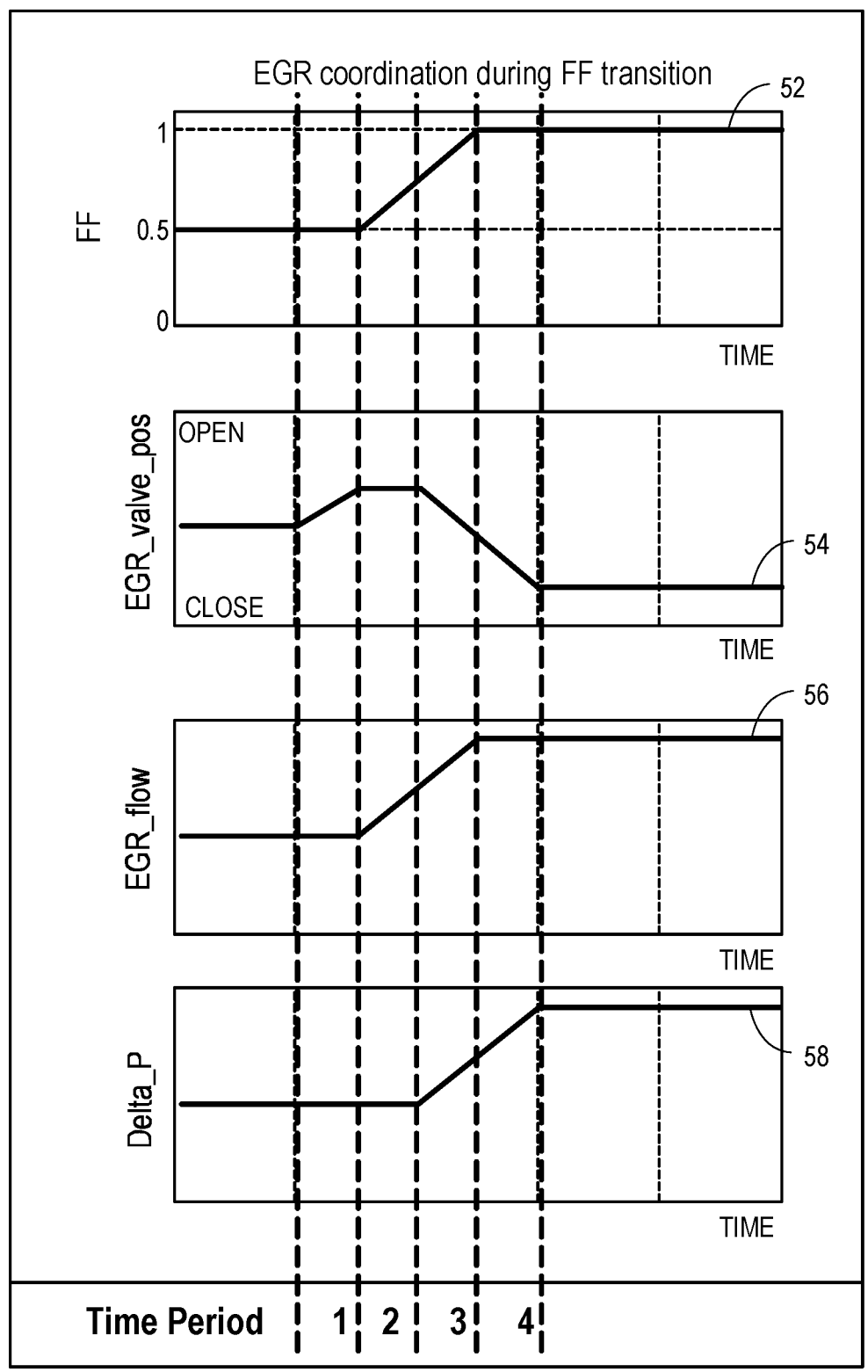
FIG. 3B illustrates a number of plots of EGR related parameters during a low to high firing fraction transition of a variable displacement engine in accordance with a non-exclusive embodiment of the invention.

Referring to FIG. 3B, a timing diagram 50 including a number of plots of key parameters during a firing fraction transition is illustrated. The plots include the firing fraction transition 52, the position 54 of the EGR valve 22, the exhaust flow 56 through the EGR valve 22 and the pressure differential $\Delta P$ 58 across the EGR valve 22. With each plot, time is provided along the horizontal axis and is partially divided into time slices or periods labeled "1", "2", "3" and "4". The overall time period depicted in each of the plots may widely vary from engine to engine and typically ranges from a several fractions of a second to a few seconds.

For the firing fraction transition, the plot 52 shows the engine 12 operating at the firing fraction of 0.5 during steady state operation. At some point, the engine controller 16 receives an updated torque demand, and in this example, makes a decision to change the firing fraction to 1 in response. Once the decision is made, the transition does not occur instantaneously, but rather, is scheduled for a point in time in the future, typically within two revolutions of the engine 12. As depicted in the plot 52 in this example, the decision to make the transition is made some time prior to period 1, but is scheduled to start at time period 2. The transition gradually occurs through time periods 2 and 3, meaning the engine 12 may operate at one or more intermediate firing fractions (e.g., 0.75) before reaching the target firing fraction of 1 at the start of period 4. In other words, a transition from a first firing fraction towards a target second firing fraction may occur by gradually altering a commanded firing fraction from the first firing fraction towards the target second firing fraction. Specifically, the firing fraction value during the transition may be based in part on the EGR fraction. The firing fraction may change in a linear manner or the change may be non-linear. The commanded firing fraction may stop at one or more intermediate firing fractions during the transition. The use of intermediate firing fractions is explained more fully below in regard to a transition from a high firing fraction to a low firing fraction.

The plot 54 shows the position of the EGR valve 22 prior to and then through the firing fraction transition. Prior to the transition, the EGR valve 22 is maintained in a steady state position. At time period 1, after the decision to transition the firing fraction is made, the position of the EGR valve is moved in anticipation of the transition. In this particular example, the position of the EGR valve 22 is moved to a more open position in time period 1 to allow more EGR flow ahead of the firing fraction transition which begins in time period 2. By moving the EGR valve 22 ahead of the firing fraction transition, the impact of transport delays are eliminated or at least mitigated. In time period 2, EGR valve 22 is maintained in the same opened position, but in time periods 3 and 4, is moved to a more closed position. As the transition approaches the target firing fraction of 1, more cylinders are fired, decreasing the pressure at the intake manifold. As a result, the EGR valve 22 is required to move toward a more closed position to restrict at least some of the EGR flow, as depicted in time periods 3 and 4. Otherwise too much EGR flow would be inducted into the cylinders 14 of the engine. By adjusting the position of the EGR valve 22 in coordination with the transition in firing faction, the ideal EGR fraction is maintained.

The plot 56 shows the EGR flow into the intake manifold of the engine 12. Since the position of the EGR valve 22 is moved in anticipation of the start of the transition in time period 1, the effects of transport delays are eliminated or mitigated by the start of period 2, which substantially coincides with the start of the firing fraction transition. As the firing fraction increases during the transition, the flow of the EGR increases to keep up with demand as more cylinders are fired. As a result, the predetermined EGR fraction is maintained. When the predetermined EGR fraction is maintained, the plot 56 will essentially track the plot 52, as illustrated in FIG. 3B.

Finally, the plot 58 shows the pressure differential ΔP across the EGR valve 22 prior to and during the transition. In time period 3 the increase in the firing fraction begins to increase the pressure differential ΔP. In order to maintain the depicted linearly increasing EGR flow shown in plot 56, the EGR valve must begin to close as depicted in plot 54.

At the end of time period 4, when the transition to the new or target firing fraction of 1 is complete, each of the parameters depicted by plots 52, 54, 56 and 58 operate in a steady state until another transition is scheduled.

Firing Fraction Transitions—High to Low

Figure 4A:
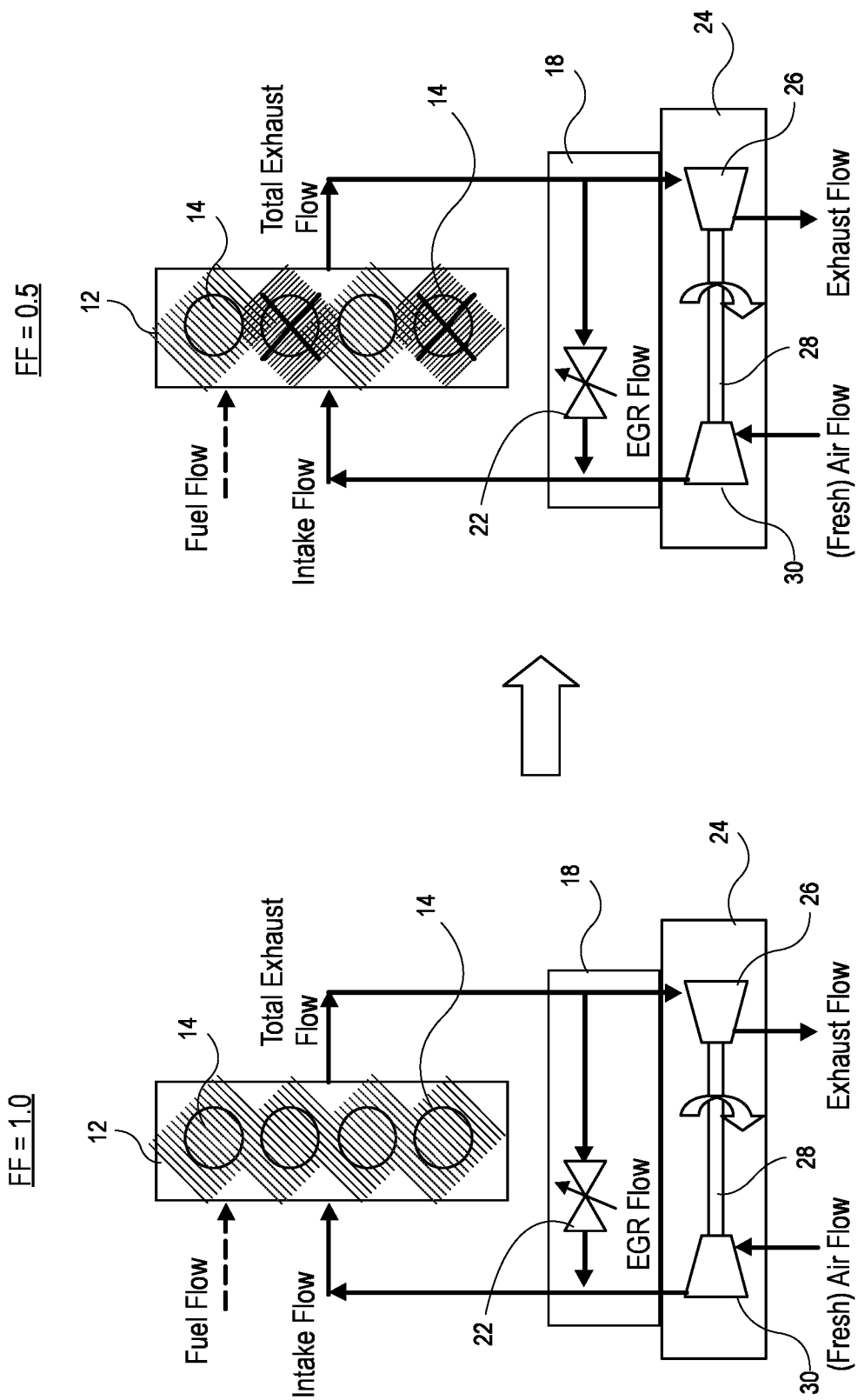
FIG. 4A is a diagram illustrating a high to a low firing fraction transition of an exemplary variable displacement engine in accordance with a non-exclusive embodiment of the invention.

Referring to FIG. 4A (a simplified schematic of FIG. 1), a diagram illustrating a high to a low firing fraction transition of the variable displacement engine 12 is shown. As depicted on the left side of the drawing, the engine 12 is operating at a high firing fraction of 1 (FF=1). On the right side of the diagram, the engine 12 is shown after the firing fraction transition to 0.5 (FF=0.5). In other words, only half of the engine's cylinders are fired, which for the exemplary four cylinders engine shown in FIG. 4A means that two cylinders are fired and two cylinders are skipped. In various alternative embodiments, the engine 12 can be operated using any of the above viable displacement techniques, including selectively activating/deactivating groups of cylinders, skip fire engine control, dynamic skip fire control, etc.

Figure 4B:
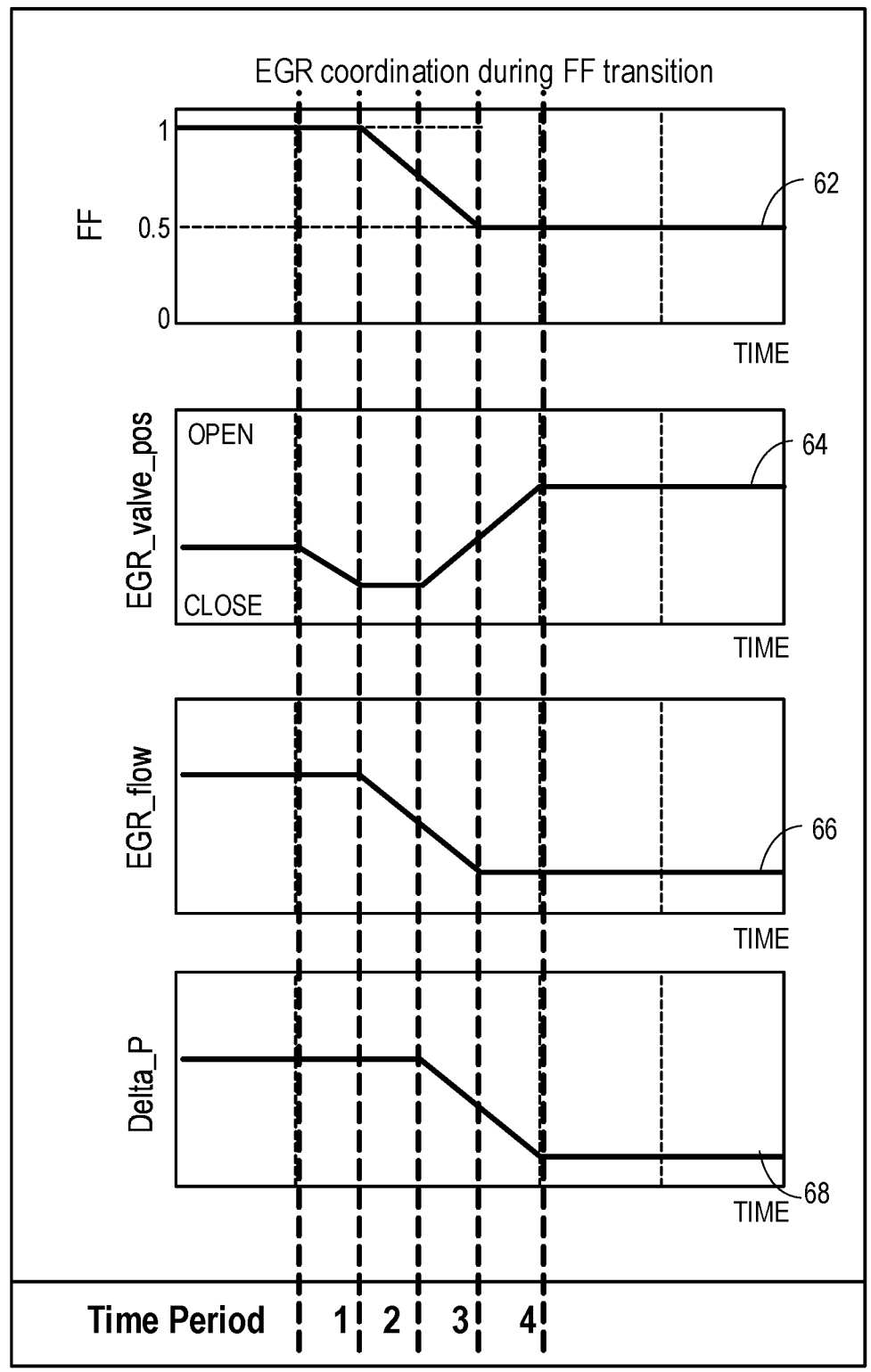
FIG. 4B illustrates a number of plots of EGR related parameters during a high to low firing fraction transition of a variable displacement engine in accordance with a non-exclusive embodiment of the invention.

Referring to FIG. 4B, a timing diagram 60 including a number of plots of key parameters during the firing fraction transition is illustrated. The plots include the firing fraction transition 62, the position 64 of the EGR valve 22, the exhaust flow 66 through the EGR valve 22 into the intake manifold of the engine 12 and the pressure differential ΔP 68 across the EGR valve 22. With each plot, time is provided along the horizontal axis and is divided into time slices or periods labeled "1", "2", "3" and "4".

The individual plots 62, 64, 66 and 68 for a high to low firing fraction transition are essentially the complement of their counterparts illustrated in FIG. 3B for a low to high transition. That is, plot 62 shows the transition beginning at time period 2 after the decision to make the transition has been made. Plot 64 shows the position of the EGR valve 22 initially in a steady state position for a firing fraction of 1, movement to a more closed position in time period 1 in anticipation of the start of the transition, remaining in the more closed position in time period 2, gradually moving to a more open position in periods 3 and 4 before finally reaching a steady state position corresponding to the new firing fraction. Plot 66 shows the EGR flow to the intake manifold of the engine 12. By controlling the position of the EGR valve 22 during the transition as described above, the EGR fraction is maintained within the predetermined range. Finally, the plot 68 shows the pressure differential ΔP across the EGR valve 22 during the transition. Again, once the transition is complete, each of the parameters depicted by plots 62, 64, 66 and 68 operate at steady state until a new firing fraction transition occurs.

During firing fraction transitions, the EGR transition will often be non-linear. For the sake of simplicity, the plot 56 (FIG. 3B) and plot 66 (FIG. 4B) show the EGR flow for transitions as linear, meaning essentially a sloped straight line up or down from the beginning to the end of the firing fraction transition. In vehicle operation under real world driving conditions; however, the EGR flow may not so linear, but rather may experience various, peaks, valleys, bumps, up or down steps, and/or other undulations during a transition. The fresh air component of the cylinder charge may also vary non-linearly during the transition in ways that may be similar to or different than that of the EGR flow. As such, the EGR fraction, which is the ratio of the recirculated gas component of the charge to the total cylinder charge, i.e. fresh air and recirculated exhaust gas, may also change in a non-linear manner and in some cases may be non-monotonic.

Figure 4C:
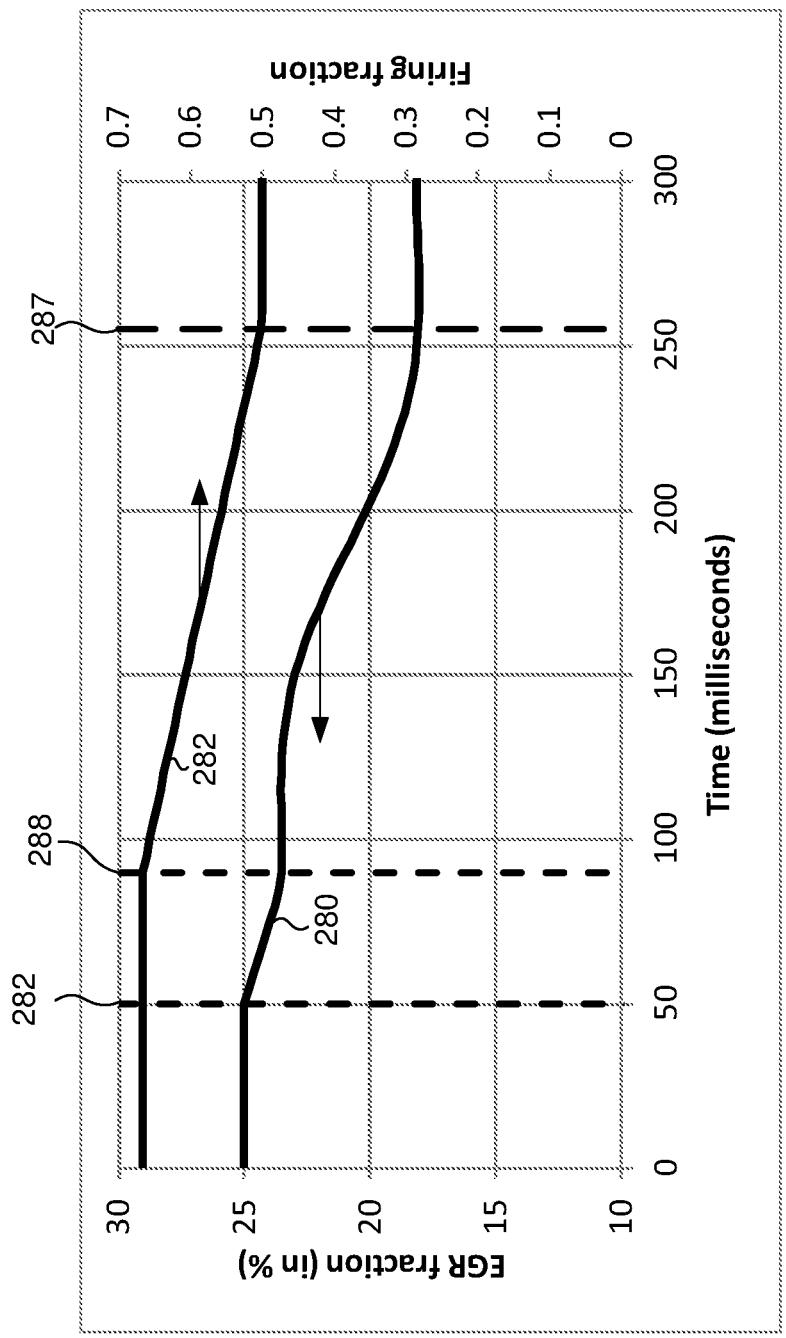
FIG. 4C illustrates a firing fraction transition having a non-linear change in the EGR fraction during the transition.

FIG. 4C illustrates an exemplary firing fraction transition between a first initial firing fraction and a second target firing fraction having a non-linear change in the EGR fraction. In this example, the firing fraction 282 changes from an initial value of ⅔ to a final value of ½ is a single linear transition. The initial EGR fraction is 25% and the final EGR value is 18.3%. The transition is initiated at 0 msec, when a signal is sent to the EGR valve to change its position. After some delay due to inherent delays in valve motion and the transport of exhaust gas back into the intake manifold, 50 msec (line 282) in this example, the EGR fraction 280 begins to change. The firing fraction 252 remains fixed at its initial value for a period after the initiation of the transition, occurring at about 90 msec in this example and denoted by line 288. The firing fraction then drops linearly towards its final value while the EGR fraction has a non-linear behavior. The transition ends at about 260 msec, denoted by line 287 at which point the firing fraction and EGR fraction have reached their values associated with the target firing fraction. It should be appreciated that in other embodiments the firing fraction may change in a non-linear manner and the EGR fraction may change in a substantially linear manner.

Figure 4D:
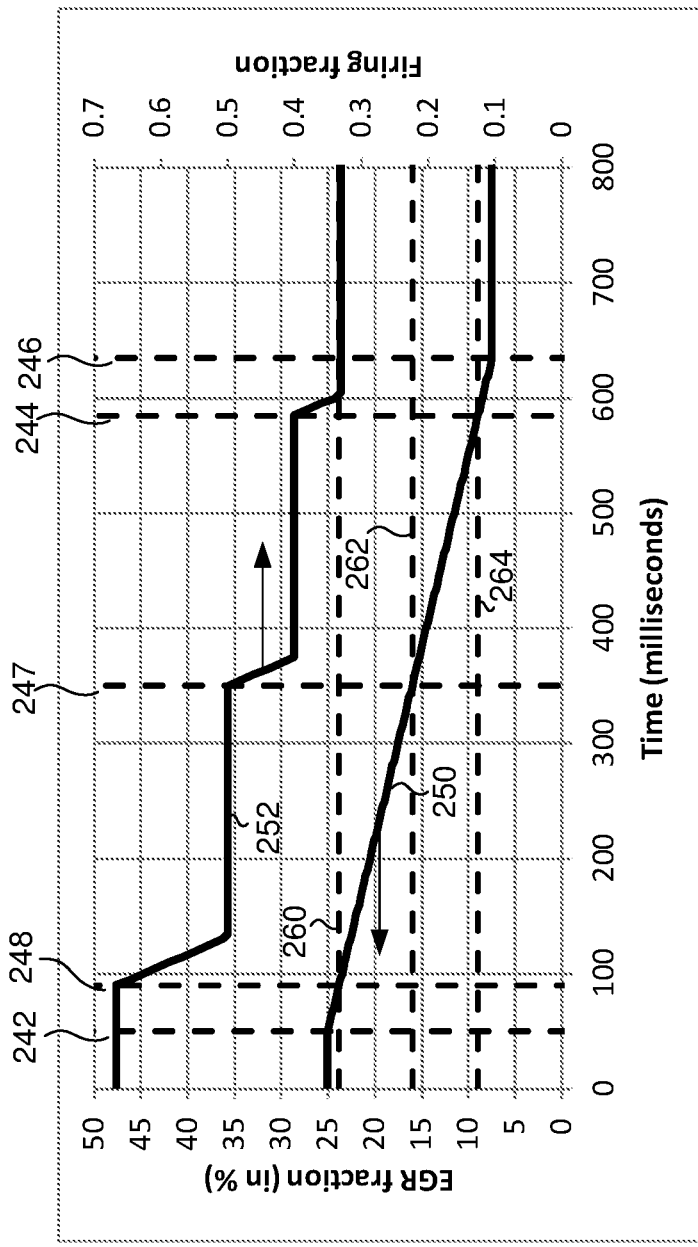
FIG. 4D illustrates a firing fraction transition having two intermediate firing fraction transition levels.

FIG. 4D illustrates such a case. In this example, a firing fraction transition has a commanded firing fraction dwell at one or more intermediate firing fractions during a transition between a first initial firing fraction and a second target firing fraction. FIG. 4D depicts the changes in the EGR fraction 250 and the firing fraction 252 as a function of time. The initial EGR fraction is 25% and the initial firing fraction is ⅔. The transition is initiated at 0 msec, when a signal is sent to the EGR valve to change its position. After some delay due to inherent delays in valve motion and the transport of exhaust gas back into the intake manifold, 50 msec in this example, the EGR fraction 250 begins to change. The firing fraction 252 remains fixed at its initial value until the EGR fraction reaches a defined range about a first intermediate EGR fraction value 260, occurring at about 90 msec and denoted by line 248. In this example, the first intermediate EGR fraction target value 260 is an EGR fraction of 23.8% associated with a first intermediate target firing fraction of ½. The firing fraction then transitions to and remains at this level until the EGR fraction is within the target range of the next intermediate or final EGR fraction target 262. In this example, the next intermediate EGR fraction target value 262 is 16% associated with an intermediate firing fraction of ⅖. The EGR fraction is within a range of this target value at 350 msec, denoted by line 247. At this time, the firing fraction begins a transition to the next intermediate firing fraction level of ⅖. Once there the firing fraction 252 remains fixed until the EGR fraction 250 reaches the defined range of its final target value 264 of 8.9% at approximately 580 msec, denoted by line 244. The firing fraction 252 then begins to transition towards its final target value, in this example ⅓. The EGR fraction continues its transition until it reaches its final value of 7.5%. The transition ends when the EGR fraction reaches its final target value at about 635 msec, denoted by line 246.

It should be appreciated that the firing fraction slew between all the firing fraction levels of the transition may not be linear and may have a different form and rate between different levels. The transition to different intermediate firing fraction levels may be triggered by the EGR fraction reaching some threshold as described above or it may be determined by a sensor reading, based on a look-up table, or may be based on some other criteria. The change in EGR fraction need not be linear as depicted in FIG. 4D but may have non-zero curvature and inflection points. It should be appreciated that not all intermediate fractions may be useful due to NVH or EGR consideration. In other words, a value of a firing fraction between the first firing fraction and target second firing fraction, such as an intermediate firing fraction, may be based at least in part on an EGR fraction. The slew rate of the EGR fraction depends on exhaust flow rate (i.e. speed/load point) and other parameters. Therefore, the time scale for the system EGR response changes depending on such parameters as exhaust flow rate, EGR flow rate, position of the EGR valve, position of the EGR cooler bypass valve, pressure differential across the EGR valve, and perhaps other variables. Note that the scales depicted in FIG. 4D should be considered as exemplary only and the time duration of the transition may be longer or shorter than that depicted. Likewise, the firing fraction and EGR fraction slew rates may be greater or less than that depicted.

The EGR valve may be adjusted using a variety of control methods. For example, there may be a simple step function change in the commanded EGR valve position to adjust the EGR fraction. However, more complex control schemes on the EGR valve may be used to achieve a faster transition in the EGR fraction. Some control schemes may integrate a feed forward control architecture with various types of feedback control, such as a PID (proportional, integral, differential) controller or state-space controller to better control EGR fraction response. In general, feed forward EGR valve control contemplates opening or closing the EGR valve more than would be appropriate for steady state operation during the transition and then backing off to the level appropriate for steady state operation. As such the motion of the EGR valve during the transition may be non-monotonic, i.e. the valve may move to a more open position and then a more closed position or vice versa. Using feed forward EGR valve control during transitions between different firing fractions can help accelerate the transition in a controlled manner which can help further reduce vibration.

Operational Flow Diagram

Figure 5:
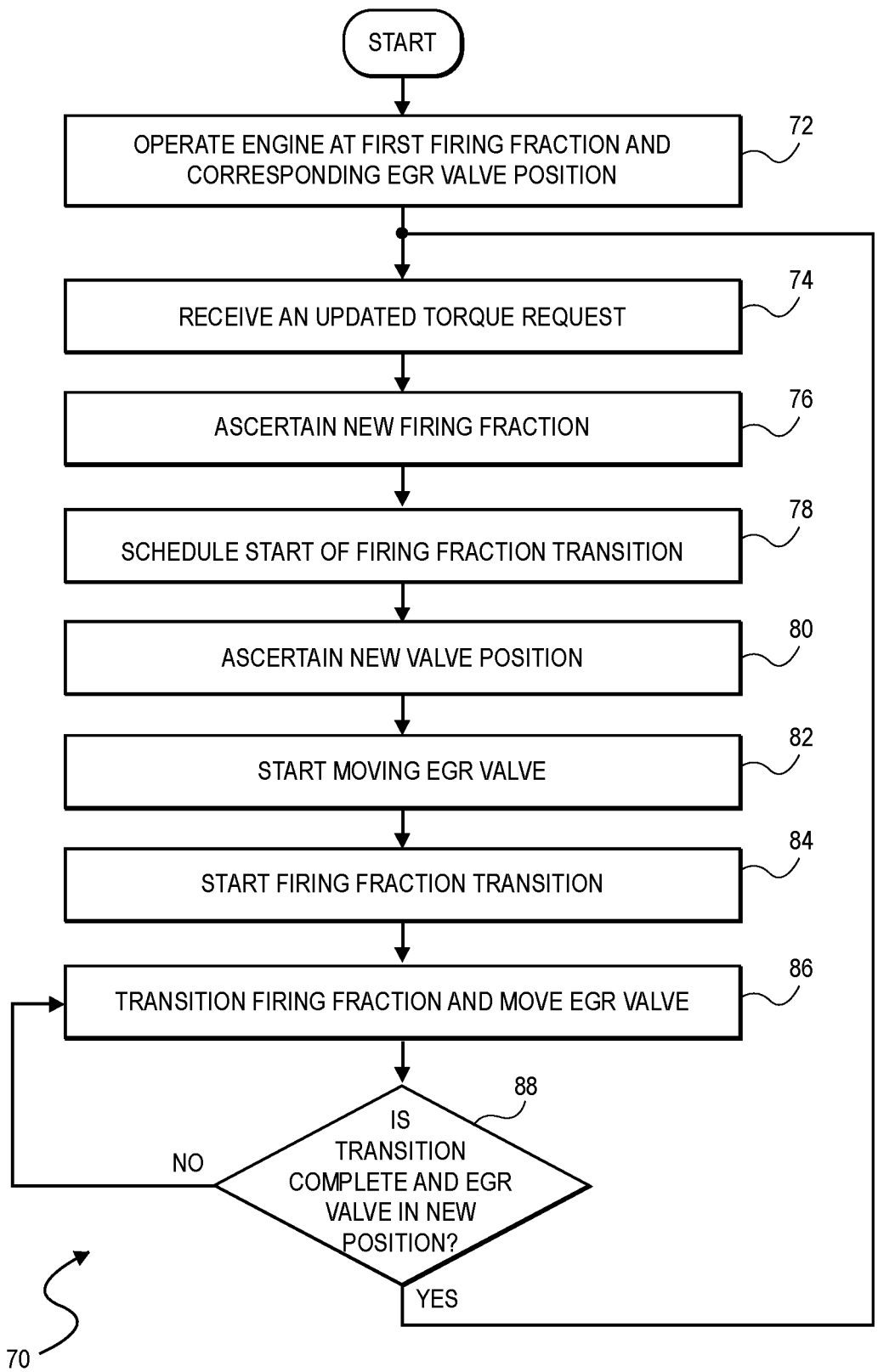
FIG. 5 is a flow diagram illustrating steps for managing operation of the EGR valve during a firing fraction transition of a variable displacement engine in accordance with a non-exclusive embodiment of the present invention.

Referring to FIG. 5, a flow diagram 70 illustrating steps for managing operation of the EGR valve 22 during firing fraction transitions of the variable displacement engine 12 is illustrated.

In an initial step 72, the engine 12 is operated at a first firing fraction needed to meet the current torque demand and the EGR valve 22 is positioned in a corresponding valve position.

In step 74, the engine controller 16 receives an updated torque request.

In step 76, the engine controller accesses the memory 16A and ascertains a new or target firing fraction that is suitable for operating the engine 12 to meet the updated torque request. In various embodiments, a suitable firing fraction to meet the current torque request is determined by the engine controller 16 accessing the data maintained in the memory 16A (See FIG. 1). As noted above, the data may include one or more tables, models derived from empirical data and/or algorithms used to determine the firing fraction and/or valve position.

In step 78, the start of the transition to the new firing fraction is scheduled. In one non-exclusive embodiment, the start is scheduled within two revolutions of the engine 12. In other embodiments, fewer or more revolutions may be used.

In step 80, a new position of the EGR valve 22 that corresponds to the new firing fraction is ascertained. In various embodiments, the corresponding position is determined by the engine controller 16 accessing the data maintained in the memory 16A. As noted above, the data may include one or more tables, models derived from empirical data and/or algorithms used to determine the position.

In step 82, the engine controller 16 generates the EGR valve control signal 20 to initiate the start of the movement of the EGR valve 22. This early movement, in anticipation of and prior to the start of the firing fraction transition, is depicted during time period 1 of the plots 54 and 64 of FIG. 3B and FIG. 4B, respectively.

In step 84, the start of the firing fraction transition is initiated as scheduled. The transition starts in time period 2 as depicted by the plots 52 and 62 in FIG. 3B and FIG. 4B, respectively.

In step 86, the transition to the new firing fraction gradually occurs (as opposed to abruptly). For instance, if the starting firing fraction was ⅜ and the new firing fraction is ¾, then the engine 12 may be operated at one or more intermediate firing fractions, such as ½ and ⅝. Substantially at the same time, the position of the EGR valve 12 is moved as needed so that the ideal EGR fraction is maintained within the predetermined range. The transition of the firing fraction and the movement of the EGR valve 22 are depicted by plots 52 and 54 of FIG. 3B and plots 62 and 64 of FIG. 4B.

In decision 88, the engine controller 16 determines if the transition of the firing fraction is complete and if the EGR valve has completed movement to the position corresponding to the new firing fraction. If one or both are not completed, control is returned to step 86. When both are completed, then control is returned to step 74 and the above process is repeated when another updated torque request is received.

Impact of Firing Pattern on EGR Fraction

Firing fractions for a given engine can be categorized as either rolling or non-rolling (fixed cylinder group) firing fractions. With a five-cylinder engine, an example of a rolling fraction would be ½. With an odd number of cylinders, each cylinder is fired at some point in the repeating pattern. On the other hand, a ½ firing fraction is a non-rolling fraction for engines having an even number of cylinders (e.g., 4, 6, or 8 cylinder engines). For non-rolling fractions, some cylinders are always skipped.

With rolling firing fractions, cylinders tend to cool between firings. Cooled cylinders may be problematic because they may result in misfires. Pilot injection of fuel is one known approach to warm a cold cylinder in an effort to prevent misfires. Also, reducing the EGR fraction for engines having cooled cylinders, can help reduce the incidence of misfires. By decreasing the EGR fraction, the oxygen level in the cylinder air-fuel mix is increased making ignition easier. Also, the higher oxygen level may result in more complete combustion and less soot generation.

Because of the impact of the firing pattern, i.e. rolling, non-rolling, number of skips between successive fires, on the desired EGR level, the nature of firing pattern may also be considered in addition to cylinder load in determining an appropriate EGR fraction. Firing patterns that have skips between adjacent cylinder firings may prefer to operate at lower EGR fraction levels than firing patterns that do not have skips between adjacent firings. As such, the nature of the firing patterns corresponding to the initial firing fraction, target firing fraction, and any possible intermediate firing fractions may influence the desired EGR fraction level during the transition.

Table I below lists exemplary relative values for a desirable EGR fraction (fraction of exhaust gas relative to total inducted gas in a combusting cylinder) for different firing fractions for an exemplary 6-cylinder engine. In Table I some of the firing fractions correspond to non-rolling firing patterns, which have certain cylinders always off in successive engine cycles. For some non-rolling patterns, the firing cylinders fire on every firing opportunity. For these non-rolling patterns, the EGR fraction is designated as having a baseline value, which is representative of all-cylinder operation. Some non-rolling patterns can have cylinders skipped between cylinder firings. For these patterns, such as a firing fraction of $\frac{1}{4}$ for a six-cylinder engine, the EGR fraction may be reduced from the baseline value in response to cooler temperatures in the cylinders due to the skipped firing opportunities A reduction in the EGR fraction is designated with one or more "–" symbols in Table I.

TABLE I

| Firing Fraction | Pattern Type | EGR Fraction |
| --- | --- | --- |
| FF = $\frac{1}{7}$ | Rolling | --- |
| FF = $\frac{1}{6}$ | Non-rolling | Baseline |
| FF = $\frac{1}{5}$ | Rolling | --- |
| FF = $\frac{1}{4}$ | Non-rolling | – |
| FF = $\frac{2}{7}$ | Rolling | --- |
| FF = $\frac{1}{3}$ | Non-rolling | Baseline |
| FF = $\frac{2}{5}$ | Rolling | -- |
| FF = $\frac{3}{7}$ | Rolling | -- |
| FF = $\frac{1}{2}$ | Non-rolling | Baseline |
| FF = $\frac{4}{7}$ | Rolling | – |
| FF = $\frac{3}{5}$ | Rolling | – |
| FF = $\frac{2}{3}$ | Non-rolling | Baseline |
| FF = $\frac{5}{7}$ | Rolling | – |
| FF = $\frac{3}{4}$ | Rolling | – |
| FF = $\frac{4}{5}$ | Rolling | – |
| FF = $\frac{5}{6}$ | Rolling | – |
| FF = $\frac{6}{7}$ | Rolling | – |
| FF = 1 | Non-rolling | Baseline |

Some of the firing fractions correspond to rolling firing patterns, which have all cylinders fire at some point in the pattern. Rolling patterns have skips between successive fires and thus cylinder conditions are different than in patterns where the firing cylinders fire at every opportunity. Lower rolling firing fractions have a greater number of skips between fires, thus all cylinders generally run cooler than when operating at higher firing fractions. Generally, the cooler the cylinder the lower the appropriate EGR fraction. Firing fractions with multiple skips between successive fires, such as $\frac{1}{7}$ may thus use a low EGR percentage, which designated by a triple minus, "---" entry in the EGR valve position column in Table I. As the firing density increases, the number of skips between firings for any given cylinder decreases and a higher EGR fraction, but still below the baseline EGR fraction, is appropriate. Thus, some firing fractions like $\frac{2}{5}$, which have either 1 or 2 skips between firings can use slightly lower EGR fraction, designated by a double minus, "--". Even higher rolling firing fractions, such as $\frac{4}{5}$, have either no or one skip between firings. They thus can use almost the same EGR fraction as all-cylinder operation or operation with a non-rolling firing fraction. This condition is designed in Table I by a single minus "–". It should be appreciated that the values in Table I are relative and may differ from engine to engine and may be based on other variables, such as cylinder load. Furthermore, the baseline EGR fraction may vary as a function of cylinder load, boost pressure, engine speed, engine coolant temperature, and other variables.

By considering these desired EGR fraction adjustments, a transition between a current firing fraction to a target new firing fraction may adjusted accordingly. As an example, suppose a transition from a firing fraction of $\frac{1}{3}$ to $\frac{1}{5}$ is required. For a six-cylinder engine, the initial firing fraction of $\frac{1}{3}$ is a non-rolling fraction and the final firing fraction is a rolling fraction. Thus, both the cylinder load and the nature of the firing fraction imply that the desired EGR fraction at the target firing fraction of $\frac{1}{5}$ is lower than the initial EGR fraction associated with initial firing fraction of $\frac{1}{3}$. Since the target EGR fraction is much lower than the initial EGR fraction the time period to transition between the two will be relatively long. If the firing fraction transitions gradually to match the EGR fraction, the resultant NVH may be unacceptable due to the long transition time. If we delay the start of the firing fraction transition excessively to reduce the firing fraction transition time, the EGR fraction at the initial firing fraction of $\frac{1}{3}$ may be too low, so $NO_x$ emissions may increase. To avoid or mitigate these problems, the EGR fraction can initially change, followed by a firing fraction change to $\frac{1}{4}$, another rolling pattern. The firing fraction can dwell at this intermediate firing fraction level with reasonable NVH and an appropriate EGR fraction as the EGR fraction continues to decrease. The transition ends when the EGR fraction is low enough that the engine can run with a firing fraction of $\frac{1}{5}$ with good emission characteristics.

Impact of Cylinder Position and Randomness of Firing Fraction Transitions

The torque demand placed on an engine of a vehicle during driving typically widely varies. For example, the driver may generate a large torque request for any number of reasons, such as accelerating following a stop, accelerating onto the on-ramp to a freeway, or the passing of another vehicle. Alternatively, the driver may demand a small torque or make no torque demand at all. For example during braking events, coasting, or cruising at a steady speed. Given the varying conditions during driving, transitions between one firing fraction to another tend to be somewhat random events.

With delta-sigma type engine controllers 16, the current accumulator state or value at any point in time depends on its history. As a result, the accumulator value is also usually not predictable. For example, in a first order sigma delta convertor, the accumulator is the running sum of the firing density since the last reset, i.e., modulo 1. Also, the exact time the transition begins is usually triggered by external events as explained above. For example, a request for an increase in torque arises from the accelerator pedal position, which is controlled by the driver and is independent of the skip/fire calculator.

With any given internal combustion engine, some cylinders will be closer to the EGR system than others. For instance with the internal combustion engine 12 illustrated in FIG. 1, the two lower most cylinders 14 are closer to the EGR valve 22 than the upper two cylinders 14. The closer a given cylinder 14 is to the EGR valve 22, the stronger and more immediate the effect of combustion events have on the EGR system 18. In other words when cylinders 14 further away from the EGR valve 22 are fired, there is typically longer transport delay of the EGR gas flow from the exhaust manifold 21, through the EGR system 18, to the intake manifold 19. In contrast, the closer the fired cylinders 14 to the EGR system 18, the shorter the transport delays.

EGR transport delays are thus influenced by a number of factors, including the randomness in changes of the demanded torque during driving, the accumulator value and past firing history since a reset with sigma-delta type engine controllers 16, and the position of fired cylinders with respect to the EGR system 18.

Additional Embodiments

In a non-exclusive embodiment, the start of a transition to a second firing fraction is scheduled within a predetermined number of revolutions of the engine 12 and the movement of the EGR valve 22 is initiated in the interim before the scheduled start of the transition. In one specific, but not exclusive embodiment, the predetermined number of revolutions is two or less.

In another non-exclusive embodiment, a method of controlling a transition of the engine 12 between different firing fractions is described. The engine 12 includes a plurality of working chambers 14 and the EGR system 18 arranged to divert a portion of the engine's exhaust gas back into the plurality of the working chambers. While the engine 12 is operating at a first firing fraction, the engine 12 may receive a request to transition to a target second firing fraction that is different than the first firing fraction. The engine 12 transitions from the first firing fraction towards the target second firing fraction by gradually altering a commanded firing fraction from the first firing fraction towards the target second firing fraction. In conjunction with the transition between the different firing fractions the exhaust gas recirculation valve 22 position is changed. The altering of the commanded firing fraction is delayed relative to initiation of the change in exhaust gas recirculation valve position by a plurality of firing opportunities, thereby helping compensate for inherent delays associated with changing an exhaust gas recirculation fraction.

In other specific, but non-exclusive embodiments, the EGR valve 22 is controlled to (a) allow an increase in EGR flow to an intake manifold 19 of the internal combustion engine 12 when the firing fraction transitions from a low value to a high value and (b) decrease the EGR flow to the intake manifold 19 when the transition is from a high to a low. In addition, the EGR flow is controlled so as to maintain an EGR fraction within a predetermined range regardless of the number of cylinders 14 of the internal combustion engine 12 that are fired during the firing fraction transition.

In yet another non-exclusive embodiment, a method of controlling a transition of an engine between different firing fractions is described. The engine has a plurality of working chambers and an exhaust gas recirculation system arranged to divert a portion of the engine's exhaust gas back into the plurality of the working chambers. The method comprises while the engine is operating at a first firing fraction, receiving a request to transition to a target second firing fraction that is different than the first firing fraction. The engine then transitions from the first firing fraction towards the target second firing fraction by gradually altering a commanded firing fraction from the first firing fraction towards the target second firing fraction. A commanded exhaust gas recirculation valve position changes in conjunction with the transition between the different firing fractions to facilitate operation at the target second firing fraction, wherein initiation of the altering of the commanded firing fraction is delayed relative to initiation of the change in exhaust gas recirculation valve position by a plurality of firing opportunity, thereby helping compensate for inherent delays associated with changing an exhaust gas recirculation fraction.

In yet another non-exclusive embodiment, a method for controlling operation of the internal combustion engine 12 is described. In accordance with the method, the internal combustion engine 12 operates at a first firing fraction and a first turbocharger configuration of the turbocharger 24 corresponding to the first firing fraction. In response to changing operating conditions, a second firing fraction for operating the internal combustion engine 12 and a second turbocharger configuration corresponding to the second firing fraction are ascertained. The turbocharger 24 is then commanded to start movement from the first configuration to the second configuration in advance of starting a transition of the internal combustion engine 12 from the first firing fraction to the second firing fraction.

Delaying Firing Fraction Transitions Based on Cylinder Position

Up to now, the present application has discussed the delay of firing fraction transitions to track or match transport delays of EGR from the exhaust manifold 21, through the EGR system 18, and into the intake manifold 19. By taking into account other operational parameters, such as the random nature of firing fraction transitions, cylinder position, and the accumulator value and past firing history, the delay can be further refined for the purpose of improving engine performance and achieving reduced emissions.

In accordance with another non-exclusive embodiment, a firing fraction transition may be delayed for a number of reasons besides simply matching or tracking EGR transport delays. These reasons include:

(1) Identifying a 'best" accumulator value for a delta-sigma type engine controller 16 for delaying the transition until a skip occurs, resetting the accumulator to the "best" value, and then using an ideal firing fraction trajectory based on current operating conditions. Two non-exclusive examples are provided below:
  (i) Consider a transition from a firing fraction of ½ to a fraction of ⅓. If the transition begins immediately and the accumulator value is, for instance 0.6, the cylinder closest to the EGR may be expected to fire several times during the course of the transition, based on knowledge of the accumulator and the transition rate. However, by delaying the start of the transition and modifying the accumulator to, for instance, 0.4, the cylinder closest to the EGR may in fact be expected to skip more often during the transition. This may slow the EGR response, which may be a desirable given the effect the change in firing fraction will have on the air-fuel ratio.

(ii) Consider a transition to a firing fraction of ⅓. With any initial accumulator value of less than ⅓ (i.e., between 0 and 0.333), the skip/fire pattern will be (skip-skip-fire-skip-skip-fire . . . ). Since the actual value in the accumulator may not be the ideal accumulator value on which to start a transition, a delay may be intentionally introduced. By way of example, assume the "best" accumulator value is 0.2. The best transition can then be guaranteed by waiting until the first skip occurs, setting the accumulator to 0.2, and using the firing density trajectory determined by current conditions;

(2) With most internal combustion engines, cylinder deactivation hardware can typically be controlled only once per engine cycle. Similarly, cylinder fueling strategies are typically formulated on a per engine cycle basis. Thus, attempting to initiate a firing fraction transition during a given engine cycle may, therefore, not be feasible due to hardware and/or fueling limitations. Accordingly, waiting or delaying the start of the transition to a next engine cycle may be beneficial to avoid these limitations;

(3) Selecting the preferred cylinder or cylinders to fire based on position (e.g., selecting the cylinders closest to the EGR system to be fired first). Since as mentioned about EGR transport delays being longer for cylinders that are further away from the EGR system 18, in some situations it may be beneficial to introduce a delay and begin a firing fraction transition based on the position of the cylinder that is first to be fired (e.g., selecting a cylinder closer to the EGR system 18); and (4) Altering the firing pattern for a given cylinder or group of cylinders. For example, by delaying a given transition, a given cylinder may experience two successive skips between fires with one starting point of a transition. But by introducing a delay before starting the transition, the same cylinder may experience only a single skip between fires.

Figure 6:
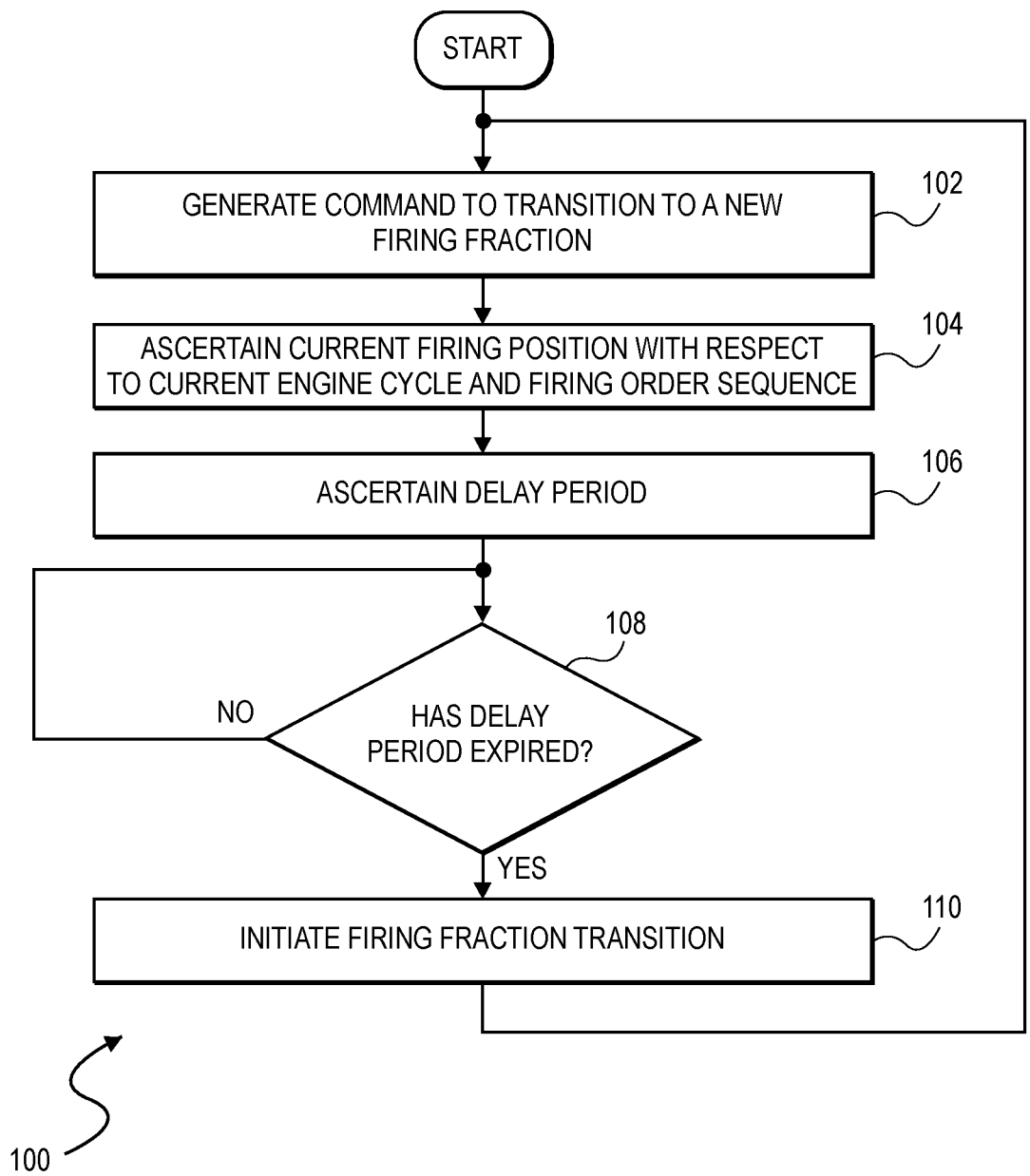
FIG. 6 is a flow diagram for implementing a delay of a firing fraction transition based on one or more other considerations besides or in addition to EGR transport delays in accordance with a non-exclusive embodiment of the present invention.

Referring to FIG. 6, a flow diagram 100 for implementing a delay before initiating a firing fraction transition based on one or any combination of the four operational parameters (1) through (4) as discussed above is illustrated.

In an initial step 102, the engine controller 16 generates a command to transition to a new firing fraction. As a general rule, the engine controller 16 generates the command in response to changing operating conditions, such as the driver has stepped on the accelerator pedal and is requesting more torque, the driving is braking and is requesting less torque, etc.

In step 104, the engine controller ascertains the current firing position of the cylinders 14 of the internal combustion engine 12 with respect to the current engine cycle and the fire order sequence. For example if the engine 12 is operating at full displacement prior to the command to a new firing fraction (e.g. ⅝), then the controller 16 will know that all the cylinders 14 will be fired during the current engine cycle. On the other hand if the engine 12 is operating at a reduced displacement, then the engine controller will know which of the cylinders 14 are to be fired and which are to be skipped in their firing sequence during the current engine cycle.

In step 106, the engine controller ascertains a delay period. A number of factors can be used in ascertaining the delay period. The delay period can be ascertained by using one or any combination of the operational parameters (1) through (4) discussed above alone and/or in combination with the EGR transport delays as described herein.

In an alternative embodiment, the delay period can be ascertained by simply waiting for a "trigger" event, such waiting for completion of the last firing opportunity of a cylinder 16 in the firing sequence order of the current engine cycle.

In decision step 108, the controller 16 determines if the ascertained time has expired or not.

In step 110, the controller 16 implements the firing fraction transition. Again, based on operating conditions and/or the difference between the starting and the new firing fraction, the trajectory of the transition may involve one or more intermediate firing fractions or no intermediate firing fractions.

The steps 102 through 110 are continually repeated during operation of the engine 12. In this way, a delay for any of the individual considerations (1) through (5), or any combination thereof, may be implemented before the transition to each now commanded firing fraction.

Alternative Embodiments

Although only a few embodiments have been described in detail, it should be appreciated that the present application may be implemented in many other forms without departing from the spirit or scope of the disclosure provided herein. For example, the invention has generally been described as adjusting the EGR valve 22 position in anticipation of a firing fraction transition. Other actuators may also be adjusted in concert with the EGR valve position. For example, the EGR cooler bypass valve 29, the intake throttle 15, the exhaust throttle 25, the fuel injector 11, and the waste gate or variable geometry turbocharger (nozzle or vane) rack position may be adjusted in concert with the EGR valve position. These adjustments may be done either before, after, or simultaneously with the adjustment in EGR valve position. Adjustments to a waste gate or a variable geometry turbocharger (nozzle or vane) rack may be referred to as adjustments to a turbocharger configuration. These adjustments may be based in part on signals received by the engine controller 16 from various sensors, including, but not limited to, an accelerator pedal position sensor, an engine speed sensor, temperature sensors, pressure sensors, oxygen sensors, $NO_x$ sensors, and mass flow sensors. There may be sensors associated with the various actuators that detect the position of the various actuators. The invention described herein may be applied when both the starting and target firing densities in a firing density transition are non-zero and may also be applied when one of the starting or target firing densities is zero, i.e. all cylinders skipped.

The invention may be applied to both skip fire controlled engines, which enable gradual adjustment of the firing fraction, and variable displacement engines with fixed groups or patterns of deactivated cylinders, which have abrupt changes in the firing fraction between different displacement levels. For both types of engine control, the EGR valve position and that of other actuators may be adjusted in a feed forward manner in advance of the firing fraction transition.

The engine controller 16 may include control algorithms that allow adaptive learning and adjustment of the control calibrations described herein. That is during engine manufacture a set of baseline values of actuator positions under various engine operating conditions may be programmed into the engine controller 16. As the engine ages and experiences different operating environments, these baseline values may no longer provide optimal engine operation. Based on readings from the various sensors in the engine system 10, the actuator position values associated with various engine operating conditions may be adjusted to provide improved engine operation. These adjustments or calibrations may be done at regular intervals or may be based on sensor readings suggesting that recalibration is required.

Therefore, the present embodiments should be considered illustrative and not restrictive and is not to be limited to the details given herein but may be modified within the scope and equivalents of the appended claims.

What is claimed is:

1. A method for controlling operation of an internal combustion engine, comprising:
    operating the internal combustion engine at a first firing fraction and a first Exhaust Gas Recirculation (EGR) valve position corresponding to the first firing fraction;
    ascertaining a second firing fraction for operating the internal combustion engine and a second EGR valve position corresponding to the second firing fraction;
    commanding the EGR valve to start movement from the first valve position to the second valve position in advance of starting a transition of the internal combustion engine from the first firing fraction to the second firing fraction; and
    maintaining an EGR fraction within a predefined range during the transition of the internal combustion engine from the first firing fraction to the second firing fraction.

2. The method of claim 1, further comprising adjusting EGR flow through the EGR valve in advance of starting the transition so that an effect of transport delays associated with the EGR flow are mitigated or avoided prior to the internal combustion engine starting the transition from the first firing fraction to the second firing fraction.

3. The method of claim 1, further comprising ramping the transition from the first firing fraction to the second firing fraction so that the internal combustion engine operates at one or more intermediate firing fractions during the transition.

4. The method of claim 1, further comprising ramping the transition from the first firing fraction to the second firing fraction so that the internal combustion engine does not abruptly transition from the first firing fraction to the second firing fraction.

5. The method of claim 1, further comprising:
    receiving a torque request;
    ascertaining the second firing fraction based on the received torque request;
    scheduling the internal combustion engine to start the transition from the first firing fraction to the second firing fraction; and
    commanding the EGR valve to start movement from the first EGR valve position in the interim time period between (a) the second firing fraction being ascertained and (b) the start of the scheduled transition.

6. The method of claim 1, wherein the internal combustion engine is scheduled to begin the transition from the first firing fraction to the second firing fraction within a predetermined number of firing opportunities after the second firing fraction is ascertained.

7. The method of claim 1, wherein the internal combustion engine begins the transition from the first firing fraction to the second firing fraction based on feedback from a sensor.

8. The method of claim 1, wherein the rate of the transition of the internal combustion engine from the first firing fraction to the second firing fraction is limited by one of the following:
    (a) EGR fraction intake limits of the internal combustion engine;
    (b) limits on filling or emptying an intake air manifold associated with the internal combustion engine;
    (c) Noise, Vibration and Harshness (NVH) considerations of a vehicle propelled by the internal combustion engine; or
    (d) any combination of (a) through (c).

9. The method of claim 1, further comprising controlling movement of the EGR so that the EGR valve reaches the second EGR valve position at substantially the same time the internal combustion engine completes the transition to the second firing fraction.

10. The method of claim 1, wherein commanding the EGR valve is performed in either the time domain or the crank angle domain.

11. The method of claim 1, wherein the second EGR valve position is ascertained from one of the following:
    (a) a Look Up Table;
    (b) a model derived from empirical data; or
    (c) an algorithm.

12. The method of claim 1, further comprising commanding the EGR valve to move in a feed forward manner to reduce the time necessary to achieve a desired EGR fraction associated with the second firing fraction.

13. The method of claim 1, further comprising commanding the EGR valve to move so as to adjust EGR flow to mitigate misfires of previously skipped cylinders.

14. The method of claim 1, wherein the internal combustion engine is one of the following types of variable displacement engines;
    (a) a multi-cylinder engine where a group of one or more cylinder(s) may be selectively deactivated;
    (b) a skip fire controlled internal combustion engine capable of selectively operating at any one of a plurality of different firing fraction, each of the plurality of different firing fractions corresponding to different effective displacements of the internal combustion engine respectively; or
    (c) a dynamic skip fire (DSF) controlled internal combustion engine where the decision to fire or skip cylinders is made on a firing opportunity-by-firing opportunity basis.

15. The method of claim 1, wherein the internal combustion engine uses one of the following types of combustion:
    (a) spark ignition (SI);
    (b) stratified charge compression ignition; or
    (c) homogeneous charge compression ignition.

16. A method of operating an internal combustion engine by:
    initiating movement of an Exhaust Gas Recirculation (EGR) valve position after a decision to transition operation of the internal combustion engine to a new firing fraction has been made, but prior to starting the transition to the new firing fraction; and
    maintaining an EGR fraction within a predetermined range by moving the EGR valve position as needed during the transition of the internal combustion engine to the new firing fraction.

17. The method of claim 16, further comprising:
scheduling the internal combustion engine to start the transition to the new firing fraction within a predetermined number of revolutions of the engine; and
initiating the movement of the EGR valve in the interim between the time the decision was made and the start of the scheduled transition to the new firing fraction.

18. The method of claim 16, further comprising during the transition to the new firing fraction, moving the EGR valve as needed so that EGR flow volume to an intake manifold of the internal combustion engine substantially is controlled such that spikes in either hydrocarbon emissions or $NO_x$ emissions are mitigated or eliminated.

19. The method of claim 16, further comprising during the transition to the new firing fraction, moving the EGR valve as needed for one or more intermediate firing fractions between a current firing fraction and the new firing fraction.

20. The method of claim 16, further comprising during the transition to the new firing fraction adjusting the EGR valve in a feed forward manner to reduce the time necessary to achieve a desired EGR fraction.

21. The method of claim 1, further comprising adjusting a position of another actuator in concert with the EGR valve motion.

22. The method of claim 21, wherein the actuator is selected from a group consisting of an EGR cooler bypass valve, an exhaust throttle, an intake throttle, a fuel injector, a waste gate valve, a charge cooler bypass valve, and a variable geometry turbocharger vane or nozzle position.

23. A method for managing a firing fraction transition of an internal combustion engine, the method comprising:
operating the internal combustion engine at a first firing fraction and a first EGR valve position;
ascertaining a second firing fraction in response to a torque request;
scheduling a start of the transition to the second firing fraction within a predetermined number of rotations of the internal combustion engine;
starting movement of the EGR valve after ascertaining the second firing fraction, but prior to starting the transition to the second firing fraction; and
moving the EGR valve as needed during the transition of the internal combustion engine from the first firing fraction to the second firing fraction so that an EGR fraction is maintained within a predetermined range during the transition.

24. The method of claim 23, wherein maintaining the EGR fraction within the predetermined range prevents or mitigates spikes in either (a) hydrocarbon emissions or (b) $NO_x$ emissions during the transition.

25. The method of claim 23, wherein moving the EGR valve further comprises controlling the EGR valve to allow an increase in EGR flow to an intake manifold of the internal combustion engine when the transition is from a low firing fraction to a high firing fraction.

26. The method of claim 23, wherein moving the EGR valve further comprises controlling the EGR valve to allow a decrease in the EGR flow to an intake manifold of the internal combustion engine when the transition is from a high firing fraction to a low firing fraction.

27. The method of claim 23, further comprising controlling the movement of the EGR valve as needed so that EGR flow to an intake manifold of the internal combustion engine is controlled to maintain the EGR fraction within the predetermined range regardless of the number of cylinders of the internal combustion engine that are fired during the transition from the first firing fraction to the second firing fraction.

28. The method of claim 23, further comprising moving the EGR valve to a second EGR valve position during the transition, wherein the second EGR valve position corresponds to the second firing fraction.

29. The method of claim 23, further comprising commanding the EGR valve to move to in a feed forward manner between the first valve position and a second valve position to reduce the time necessary to achieve a desired EGR fraction.

30. The method of claim 23, further comprising commanding the EGR valve to move so as to adjust EGR flow to mitigate misfires of previously skipped cylinders.

31. The method of claim 23, wherein the moving of the EGR valve is adjusted based on adaptive learning.

32. A method of controlling an engine including a plurality of working chambers and an exhaust gas recirculation system arranged to divert a portion of exhaust gas produced by the engine back into the plurality of the working chambers, the method comprising:
while the engine is operating at a first firing fraction, receiving a request to transition to a second firing fraction that is different than the first firing fraction;
changing a commanded exhaust gas recirculation valve position in conjunction with the request to transition to the second firing fraction and to facilitate operation at the second firing fraction;
transitioning from the first firing fraction towards the second firing fraction by gradually altering a commanded firing fraction from the first firing fraction towards the second firing fraction; and
maintaining an EGR fraction within a predetermined range by adjusting the exhaust gas recirculation valve position as needed during the transition from the first firing fraction towards the second firing fraction,
wherein initiation of the altering of the commanded firing fraction is delayed relative to initiation of the change in exhaust gas recirculation valve position by one or more firing opportunities, thereby helping compensate for inherent delays associated with changing an exhaust gas recirculation fraction.

33. A method of operating an engine including a plurality of working chambers and an Exhaust Gas Recirculation (EGR) system arranged to divert a portion of exhaust gas produced by the engine back into the plurality of the working chambers, the method comprising:
while the engine is operating at a first firing fraction, receiving a request to transition to a target second firing fraction that is different than the first firing fraction;
transitioning from the first firing fraction towards the target second firing fraction by commanding an intermediate firing fraction between the first firing fraction and the target second firing fraction;
changing a commanded EGR valve position in conjunction with the transition to facilitate operation at the target second firing fraction, wherein a value of the intermediate firing fraction is based at least in part on an EGR fraction; and
maintaining an EGR fraction within a predetermined range by adjusting the EGR valve position as needed during the transitioning from the first firing fraction, through the intermediate firing fraction, and towards the second firing fraction.

34. The method of claim 33, wherein the intermediate firing fraction remains constant over a plurality of firing opportunities.

35. The method of claim 1, wherein the EGR fraction is a ratio of EGR relative to a total charge provided to the cylinders of the internal combustion engine and the predefined range is a percentage range of the EGR relative to the total charge.

36. The method of claim 16, wherein the EGR fraction is a ratio of EGR relative to a total charge provided to the cylinders of the internal combustion engine and the predefined range is a percentage range of the EGR relative to the total charge.

37. The method of claim 32, wherein the EGR fraction is a ratio of EGR relative to a total charge provided to the working chambers of the engine and the predefined range is a percentage range of the EGR relative to the total charge.

38. The method of claim 33, wherein the EGR fraction is a ratio of EGR relative to a total charge provided to the working chambers of the engine and the predefined range is a percentage range of the EGR relative to the total charge.

\* \* \* \* \*